(12) United States Patent
Kawasaki

(10) Patent No.: US 10,962,758 B2
(45) Date of Patent: Mar. 30, 2021

(54) IMAGING SYSTEM AND IMAGE CONSTRUCTION METHOD

(71) Applicant: OLYMPUS CORPORATION, Hachioji (JP)

(72) Inventor: Kenji Kawasaki, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/444,060

(22) Filed: Jun. 18, 2019

(65) Prior Publication Data
US 2019/0391381 A1 Dec. 26, 2019

(30) Foreign Application Priority Data

Jun. 22, 2018 (JP) .............................. JP2018-119284

(51) Int. Cl.
*G02B 21/36* (2006.01)
*G02B 21/00* (2006.01)
*G02B 21/24* (2006.01)

(52) U.S. Cl.
CPC ....... *G02B 21/365* (2013.01); *G02B 21/0032* (2013.01); *G02B 21/244* (2013.01); *G02B 21/362* (2013.01)

(58) Field of Classification Search
CPC .......................... G02B 21/365; G02B 21/0032; G02B 21/244; G02B 21/362; G02B 21/36; G02B 21/361; G02B 21/364; G02B 21/367
See application file for complete search history.

(56) References Cited

U.S. PATENT DOCUMENTS

| 6,259,080 | B1 | 7/2001 | Li et al. |
| 7,116,487 | B2 * | 10/2006 | Miyauchi ............... G02B 13/04 359/663 |
| 2009/0115718 | A1 * | 5/2009 | Qiao ..................... G09G 3/3611 345/102 |
| 2010/0171809 | A1 * | 7/2010 | Fujiyoshi ............. G02B 21/367 348/36 |
| 2016/0124209 | A1 * | 5/2016 | Arai ..................... G02B 21/367 348/80 |
| 2017/0171484 | A1 * | 6/2017 | Takemoto .............. H04N 9/045 |

FOREIGN PATENT DOCUMENTS

| JP | 11264937 A | 9/1999 |
| JP | 2011118107 A | 6/2011 |

* cited by examiner

*Primary Examiner* — Alexander Gee
(74) *Attorney, Agent, or Firm* — Holtz, Holtz & Volek PC

(57) ABSTRACT

An imaging system includes: an imaging apparatus that includes an image sensor and acquires a captured image; an optical system that includes a first objective and forms, within the image sensor, an optical image of a visual-field region that is a region within an object surface that corresponds to the objective field number (OFN) of the first objective; a motorized stage; and a control apparatus that constructs a first wide region image by piecing together a plurality of constituent images included in a plurality of captured images acquired by controlling the motorized stage and the imaging apparatus, the first wide region image being an image of a region wider than the visual-field region. Each of the plurality of constituent images is a portion of each of the plurality of captured images and is also at least a portion of each of images of a plurality of visual-field regions.

14 Claims, 23 Drawing Sheets

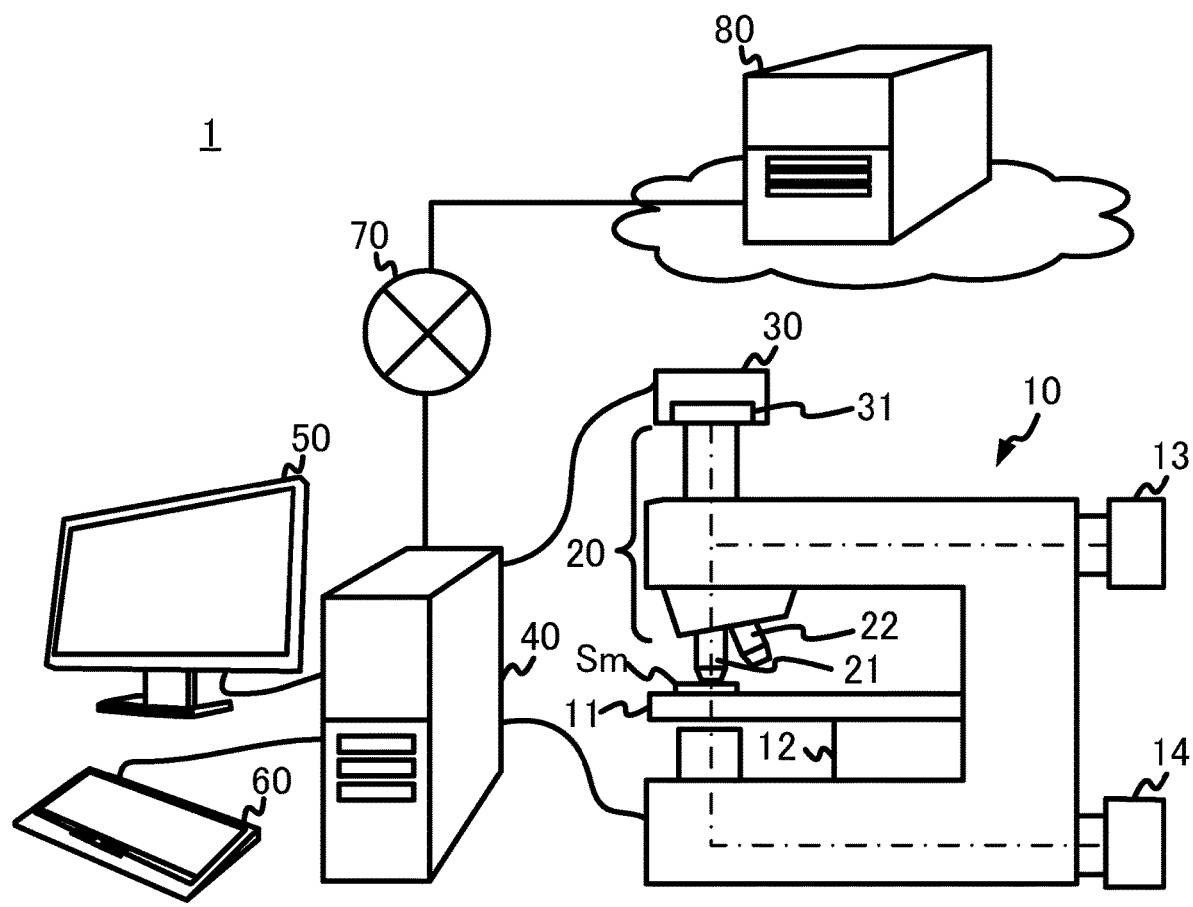
F I G. 1

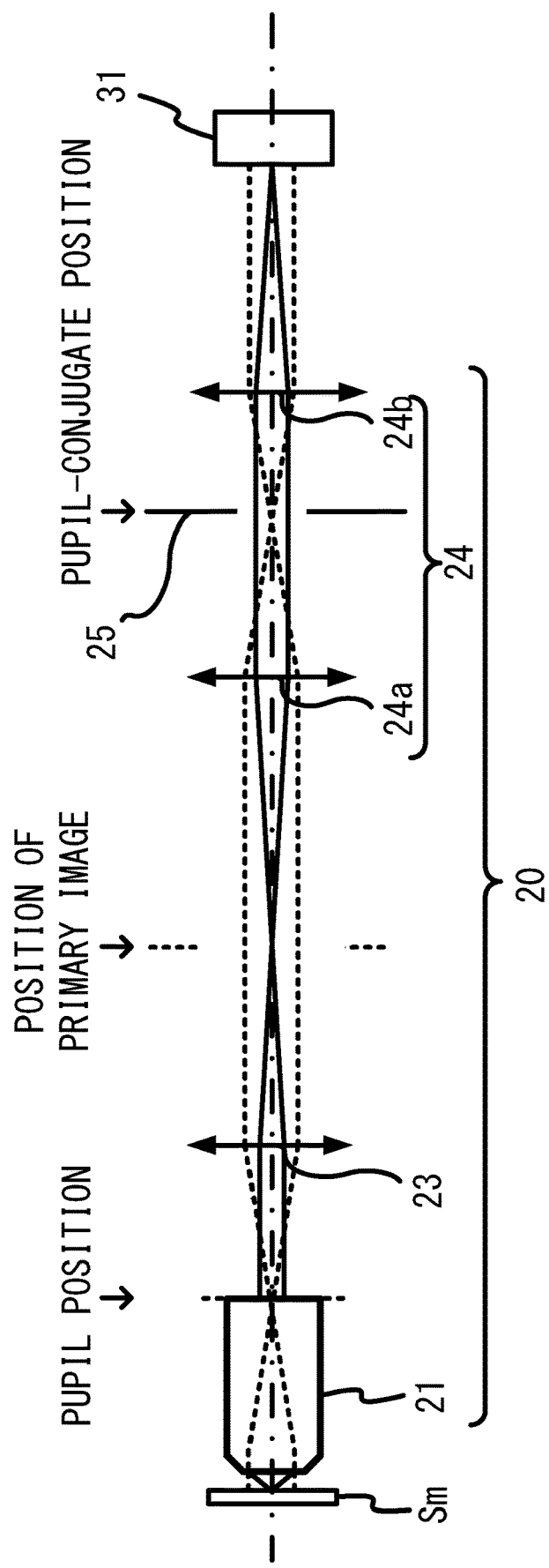
F I G. 2

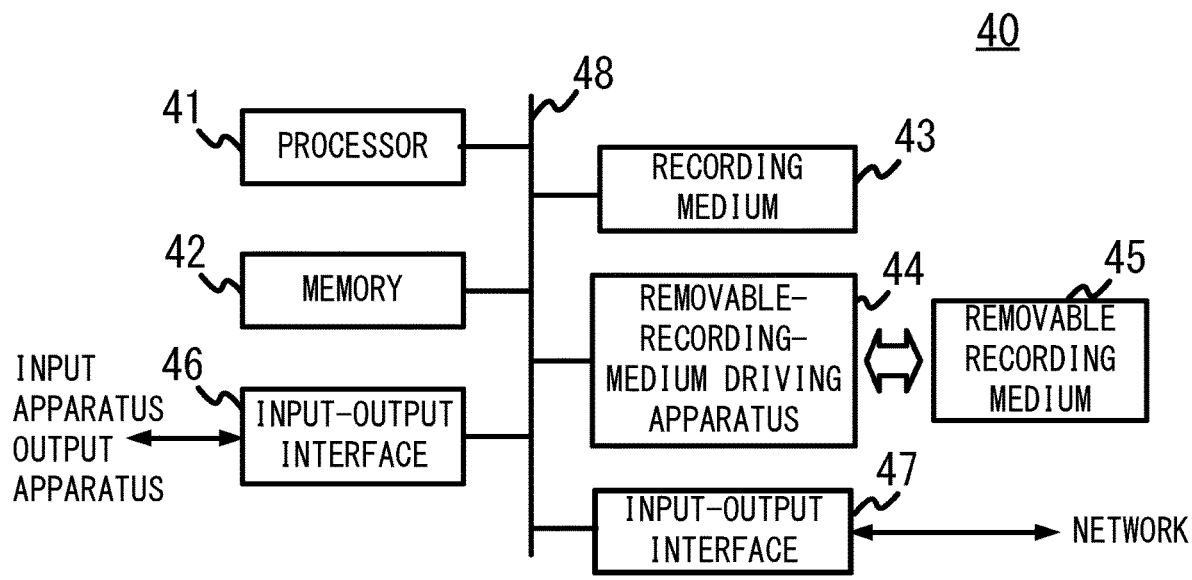
F I G. 4

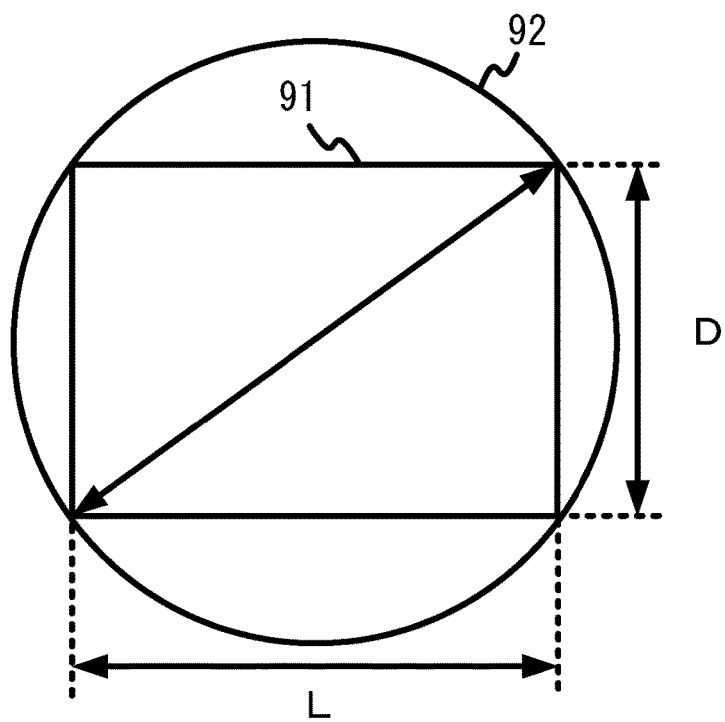
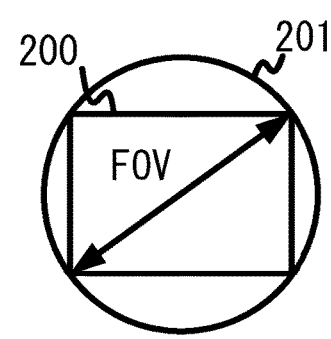
F I G. 5A    F I G. 5B

RELATIONSHIP ON IMAGE SIDE
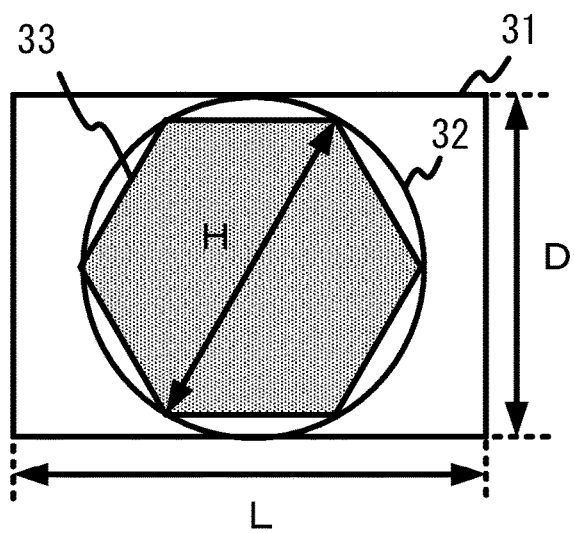
RELATIONSHIP ON OBJECT SIDE
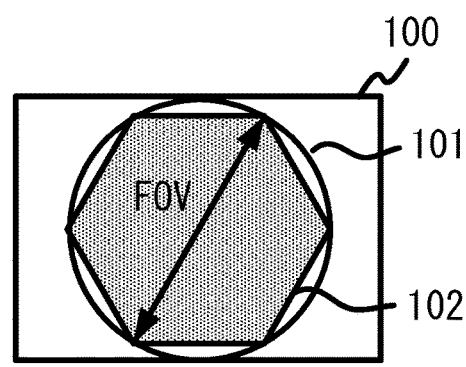
F I G.   6 A
F I G.   6 B

|  | EXAMPLE 1-1 | EXAMPLE 1-2 | EXAMPLE 1-3 | EXAMPLE 1-4 | EXAMPLE 1-5 | EXAMPLE 1-6 | EXAMPLE 1-7 | EXAMPLE 1-8 | EXAMPLE 1-9 |
|---|---|---|---|---|---|---|---|---|---|
| IMAGE SENSOR | 2/3 TYPE | 2/3 TYPE | 4/3 TYPE | 4/3 TYPE | 4/3 TYPE | 35 mm FULL SIZE | 35 mm FULL SIZE | MEDIUM SIZE | MEDIUM SIZE |
| D (mm) | 6.6 | 6.6 | 13 | 13 | 13 | 24 | 24 | 33 | 40.4 |
| L (mm) | 8.8 | 8.8 | 17.3 | 17.3 | 17.3 | 36 | 36 | 44 | 53.7 |
| H (mm) | 6.6 | 7.62 | 14.8 | 13 | 13 | 22 | 25 | 25 | 44 |
| M | 6.0 | 6.3 | 12.0 | 12.0 | 12.0 | 20.0 | 20.0 | 20.0 | 40.0 |
| FOB (mm) | 9.0 | 9.0 | 9.0 | 9.0 | 9.0 | 9.0 | 9.0 | 9.0 | 9.0 |
| Φ: DIAMETER OF IMAGING REGION (mm) | 1.10 | 1.21 | 1.23 | 1.08 | 1.08 | 1.10 | 1.25 | 1.25 | 1.10 |
| FTL (mm) | 54.0 | 56.7 | 108.0 | 108.0 | 108.0 | 180.0 | 180.0 | 180.0 | 360.0 |
| SAMPLE-SIDE IMAGE SHOOTING RANGE h 1 (mm) | 0.953 | 1.047 | 1.068 | 0.938 | 0.938 | 0.953 | 1.083 | 1.083 | 0.953 |
| SAMPLE-SIDE IMAGE SHOOTING RANGE h 2 (mm) | 1.100 | 1.210 | 1.233 | 1.250 | 1.250 | 1.100 | 1.250 | 1.250 | 1.100 |
| S (mm) | 0 | 0.079365079 | 0 | 0.16666667 | 0.15 | 0.1 | 0.05 | 0.15 | 0.025 |
| H/D | 1.00 | 1.15 | 1.14 | 1.00 | 1.00 | 0.92 | 1.04 | 0.76 | 1.09 |
| P (mm) | 0.953 | 0.968 | 1.068 | 0.769 | 0.788 | 0.853 | 1.033 | 0.933 | 0.928 |
| (H/M-S)/(H/M) | 1.00 | 0.92 | 1.00 | 0.78 | 0.81 | 0.88 | 0.95 | 0.84 | 0.97 |
| NUMBER OF TIMES IMAGE SHOOTING IS PERFORMED (15mm × 15mm) | 313 | 313 | 280 | 471 | 460 | 389 | 279 | 313 | 333 |

F I G. 20

| | EXAMPLE 1-1 | EXAMPLE 1-2 | EXAMPLE 1-3 | EXAMPLE 1-4 | EXAMPLE 1-5 | EXAMPLE 1-6 | EXAMPLE 1-7 | EXAMPLE 1-8 | EXAMPLE 1-9 |
|---|---|---|---|---|---|---|---|---|---|
| SIZE | 2/3 TYPE | 2/3 TYPE | 4/3 TYPE | 4/3 TYPE | 4/3 TYPE | 35 mm FULL SIZE | 35 mm FULL SIZE | MEDIUM SIZE | MEDIUM SIZE |
| NUMERICAL APERTURE OF OBJECTIVE | 0.75 | 0.75 | 0.75 | 0.75 | 0.75 | 0.75 | 0.75 | 0.75 | 0.75 |
| NAI: NUMERICAL APERTURE OF IMAGE SIDE | 0.125 | 0.119 | 0.063 | 0.063 | 0.063 | 0.038 | 0.038 | 0.038 | 0.019 |
| PIXEL PITCH k (μm) | 2.5 | 2.5 | 2.2 | 2.8 | 2.8 | 4.5 | 4 | 5 | 4 |
| (1.22 × λ/NAI)/k, λ=0.55 μm | 2.1 | 2.3 | 4.9 | 3.8 | 3.8 | 4.0 | 4.5 | 3.6 | 8.9 |
| k/M | 0.42 | 0.40 | 0.18 | 0.23 | 0.23 | 0.23 | 0.20 | 0.25 | 0.10 |

F I G. 2 1

| | EXAMPLE2-1 | EXAMPLE2-2 | EXAMPLE2-3 | EXAMPLE2-4 | EXAMPLE2-5 |
|---|---|---|---|---|---|
| IMAGE SENSOR | 2/3 TYPE | 4/3 TYPE | 35 mm SIZE | MEDIUM SIZE | MEDIUM SIZE |
| D (mm) | 6.6 | 13 | 24 | 33 | 40.4 |
| L (mm) | 8.8 | 17.3 | 36 | 44 | 53.7 |
| LENGTH OF DIAGONAL LINE OF IMAGE SENSOR (mm) | 11 | 21.6 | 43.3 | 55.0 | 67.2 |
| M | 1.2 | 2.4 | 4.0 | 4.0 | 8.0 |
| FOB (mm) | 45.0 | 45.0 | 45 | 45.0 | 45.0 |
| FTL (mm) | 54.0 | 108.0 | 180 | 180.00 | 360.00 |
| PD (mm) | 5.35 | 5.27 | 5.50 | 7.25 | 4.05 |
| PL (mm) | 7.183 | 7.058 | 8.500 | 10.000 | 5.713 |
| LENGTH OF DIAGONAL LINE OF IMAGING REGION (mm) | 9.2 | 9.0 | 10.8 | 13.8 | 8.4 |
| SHORTER EDGE OF IMAGING REGION (mm) | 5.5 | 5.42 | 6.00 | 8.25 | 5.05 |
| LONGER EDGE OF IMAGING REGION (mm) | 7.33 | 7.21 | 9.00 | 11.00 | 6.71 |
| NUMBER OF TIMES IMAGE SHOOTING IS PERFORMED (15mm × 15mm) | 9 | 9 | 6 | 6 | 12 |
| NA1 | 0.75 | 0.75 | 0.75 | 0.75 | 0.75 |
| NA10 | 0.75 | 0.75 | 0.75 | 0.75 | 0.75 |
| NA2 | 0.1 | 0.1 | 0.08 | 0.08 | 0.08 |
| NA20 | 0.16 | 0.16 | 0.16 | 0.16 | 0.16 |
| NA2/NA20 | 0.625 | 0.625 | 0.5 | 0.5 | 0.5 |
| NA1/NA10 | 1 | 1 | 1 | 1 | 1 |

F I G. 2 2

| | REFERENCE EXAMPLE 1 | REFERENCE EXAMPLE 2 | REFERENCE EXAMPLE 3 | REFERENCE EXAMPLE 4 | REFERENCE EXAMPLE 5 | REFERENCE EXAMPLE 6 | REFERENCE EXAMPLE 7 | REFERENCE EXAMPLE 8 |
|---|---|---|---|---|---|---|---|---|
| IMAGE SENSOR | 2/3 TYPE | 4/3 TYPE | 35 mm SIZE | MEDIUM SIZE | 2/3 TYPE | 4/3 TYPE | 35 mm SIZE | MEDIUM SIZE |
| D (mm) | 6.6 | 13 | 24 | 33 | 6.6 | 13 | 24 | 33 |
| L (mm) | 8.8 | 17.3 | 36 | 44 | 8.8 | 17.3 | 36 | 44 |
| LENGTH OF DIAGONAL LINE OF IMAGE SENSOR (mm) | 11 | 21.6 | 43.3 | 55 | 11 | 21.6 | 43.3 | 55 |
| M | 10 | 20 | 40 | 40 | 2 | 4 | 8 | 8 |
| FOB (mm) | 9.0 | 9.0 | 9.0 | 9.0 | 45.0 | 45.0 | 45.0 | 45.0 |
| FTL (mm) | 90.0 | 180.0 | 360.0 | 360.0 | 90.0 | 180.0 | 360.0 | 360.0 |
| PD (mm) | 0.56 | 0.55 | 0.5 | 0.525 | 3.15 | 3.1 | 2.5 | 3.125 |
| PL (mm) | 0.78 | 0.98 | 0.8 | 0.8 | 4.25 | 4.175 | 4 | 4.5 |
| LENGTH OF DIAGONAL LINE OF IMAGING REGION (mm) | 1.1 | 1.08 | 1.08 | 1.375 | 5.5 | 5.4 | 5.41 | 6.875 |
| SHORTER EDGE OF IMAGING REGION (mm) | 0.66 | 0.65 | 0.6 | 0.825 | 3.3 | 3.25 | 3 | 4.125 |
| LONGER EDGE OF IMAGING REGION (mm) | 0.88 | 0.865 | 0.9 | 1.1 | 4.4 | 4.325 | 4.5 | 5.5 |
| NUMBER OF TIMES IMAGE SHOOTING IS PERFORMED (15mm×15mm) | 540 | 560 | 570 | 551 | 20 | 20 | 24 | 20 |

F I G. 2 3

IMAGING SYSTEM AND IMAGE CONSTRUCTION METHOD

CROSS REFERENCE TO RELATED APPLICATIONS

This application is based upon and claims the benefit of priority from prior Japanese Patent Application No. 2018-119284, filed Jun. 22, 2018, the entire contents of which are incorporated herein by this reference.

BACKGROUND OF THE INVENTION

Field of the Invention

The disclosure herein relates to an imaging system and an image construction method.

Description of the Related Art

In the field of pathological examinations, apparatuses have been proposed wherein enlarged images of small regions of a sample are sequentially shot, and a virtual slide image (also referred to as a whole slide image (WSI)) is constructed by seamlessly piecing together a plurality of images. Such apparatuses are described in, for example, Japanese Laid-open Patent Publication Nos. 11-264937 and 2011-118107 and can achieve both a high resolution and a wide visual field range.

SUMMARY OF THE INVENTION

An imaging system in accordance with an aspect of the present invention includes: an imaging apparatus that includes an image sensor for converting an optical image into an electric signal and acquires a captured image on the basis of the electric signal; an optical system that includes a first objective and forms, within the image sensor, an optical image of a visual-field region that is a region within an object surface that corresponds to the objective field number (OFN) of the first objective; a motorized stage that moves the object surface with reference to an optical axis of the first objective; and a control apparatus that constructs a first wide region image by piecing together a plurality of constituent images included in a plurality of captured images acquired by controlling the motorized stage and the imaging apparatus, the first wide region image being an image of a region wider than the visual-field region, wherein the plurality of captured images are images of a plurality of different regions within the object surface, each of the plurality of constituent images is a portion of each of the plurality of captured images and is also at least a portion of each of images of a plurality of visual-field regions, and a plurality of optical-axis positions of the first objective that correspond to the plurality of visual-field regions are different from each other.

An image construction method in accordance with an aspect of the invention includes: forming, within an image sensor, an optical image of a visual-field region that is a region within an object surface that corresponds to the objective field number (OFN) of a first objective; acquiring a captured image on the basis of an electric signal that is the optical image converted by the image sensor; and constructing a first wide region image by piecing together a plurality of constituent images included in a plurality of captured images, the first wide region image being an image of a region wider than the visual-field region, wherein the plurality of captured images are images of a plurality of different regions within the object surface, each of the plurality of constituent images is a portion of each of the plurality of captured images and is also at least a portion of each of images of a plurality of visual-field regions, and a plurality of optical-axis positions of the first objective that correspond to the plurality of visual-field regions are different from each other.

BRIEF DESCRIPTION OF THE DRAWINGS

The present invention will be more apparent from the following detailed description when the accompanying drawings are referenced.

FIG. 1 illustrates the configuration of an imaging system 1;

FIG. 2 is a light-ray diagram for an area from a sample Sm to an image sensor 31 provided when an objective 21 is disposed in an optical axis;

FIG. 4 illustrates the hardware configuration of a control apparatus 40;

FIG. 5A illustrates a relationship between an image sensor 91 and an image circle 92 in a conventional imaging system;

FIG. 5B illustrates a relationship between a visual-field region 201 and an imaging region 200;

FIG. 6A illustrates a relationship between an image sensor 31 and an image circle 32 in an imaging system 1;

FIG. 6B illustrates a relationship between a visual-field region 101 and an imaging region 100;

FIG. 20 illustrates a table indicating numerical data of individual examples for constructing a first wide region image;

FIG. 21 illustrates a table indicating additional numerical data of individual examples for constructing a first wide region image;

FIG. 22 illustrates a table indicating numerical data of individual examples for constructing a second wide region image; and FIG. 23 illustrates a table indicating numerical data of reference examples for constructing a wide region image.

DESCRIPTION OF THE EMBODIMENTS

Figure 3:
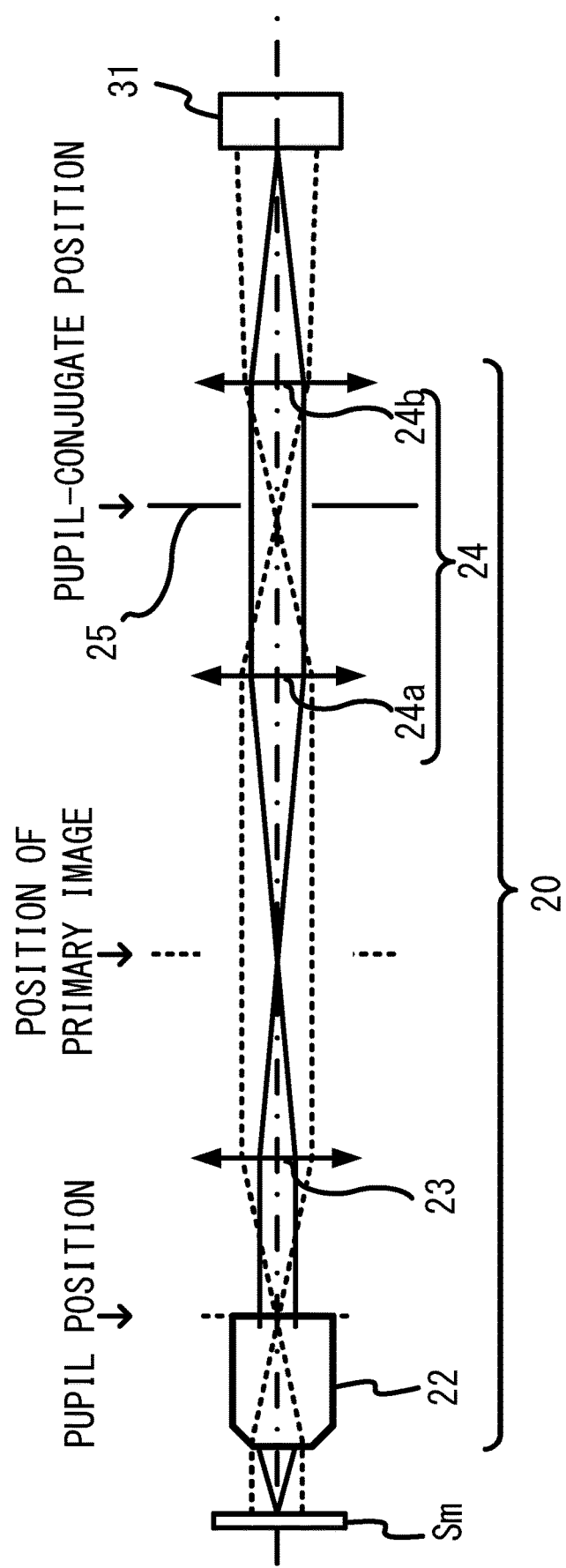
FIG. 3 is a light-ray diagram for an area from a sample Sm to an image sensor 31 provided when an objective 22 is disposed in an optical axis.

A conventional apparatus takes a long time to construct a virtual slide image. Accordingly, it will be desirable to reduce the time required to construct an image.

FIG. 1 illustrates the configuration of an imaging system 1. The imaging system 1 constructs an image of a wide region by using a plurality of images acquired by a microscope apparatus 10. For example, the imaging system 1 may be, but is not limited to, a virtual slide system that constructs a virtual slide image to be used in a pathological examination.

As depicted in FIG. 1, the imaging system 1 includes a microscope apparatus 10 and a control apparatus 40. The imaging system 1 may include a display apparatus 50 and an input apparatus 60 and may further include a recording apparatus 80 connected to the control apparatus 40 over a network 70.

The microscope apparatus 10 includes a stage 11, a stage driver 12, light sources (light sources 13 and 14), an illumination optical system (not illustrated), an imaging optical system 20, and an imaging apparatus 30. The imaging apparatus 30 includes an image sensor 31.

The stage 11, on which a sample Sm is to be placed as an object to be imaged, is a motorized stage for which the control apparatus 40 performs driving control. The stage 11 moves an object surface with reference to the optical axis of an objective disposed in the optical axis of the imaging optical system 20. The stage 11 may move an object surface in a direction orthogonal to the optical axis of the objective (X direction or Y direction) and may move the object surface in the optical axis direction of the objective (i.e., Z direction).

The stage driver 12 is an actuator that includes a motor for moving the stage 11. For example, the motor may be a stepping motor or an ultrasonic motor. The stage driver 12 may include an encoder for detecting the amount of movement. The stage driver 12 is a scanner that changes an imaging region by moving the stage 11 in the horizontal direction (X direction or Y direction) in accordance with an instruction from the control apparatus 40. The imaging region is a region for which the imaging apparatus 30 captures an image. The stage driver 12 is also a focusing unit that makes a focus adjustment by changing the distance between the objective and the stage 11 by moving the stage 11 in the vertical direction in accordance with an instruction from the control apparatus 40.

The light source 13 is a light source for epi-illumination. The light source 13 is, for example, a lamp light source such as a mercury lamp or a xenon lamp. A light-guide light source may substitute the light source 13. A light source 14 is a light source for transmitted illumination. For example, the light source 14 may be an LED light source or a halogen light source. Neither of the light sources 13 and 14 is limited to a particular type of light source. The light sources 13 and 14 may be laser light sources.

The imaging optical system 20 projects an optical image of sample Sm onto the imaging apparatus 30. As depicted in FIG. 1, the imaging optical system 20 includes objectives 21 and 22 that can be switched with each other for use. As depicted in FIGS. 2 and 3, the imaging optical system 20 further includes a tube lens 23, a relay optical system 24, and an aperture stop 25.

FIG. 2 is a light-ray diagram for an area from sample Sm to the image sensor 31 provided when the objective 21 is disposed in the optical axis. FIG. 3 is a light-ray diagram for an area from sample Sm to the image sensor 31 provided when the objective 22 is disposed in the optical axis. The solid lines in FIGS. 2 and 3 indicate axial marginal rays, and the broken lines indicate outermost off-axis principal rays.

The objectives 21 and 22 are each an infinity-corrected microscope objective to be used in combination with the tube lens 23. Each of the objectives 21 and 22 may be a dry objective or an immersion objective. The objective 21, which is a first objective of the imaging system 1, has a magnification higher than that of the objective 22 and a maximum numerical aperture greater than that of the objective 22. The objective 22, which is a second objective of the imaging system 1, has a magnification lower than that of the objective 21 and a maximum numerical aperture less than that of the objective 21. The objective 21 has an objective field number (OFN) equal to that of the objective 22, and this objective field number is, for example, 22. An OFN is the maximum field number of a tube lens to be combined with an objective in the designing process for the objective. When an objective with a 20-fold magnification has an OFN of 22, the field number of a tube lens to be combined with this objective is 22, and the observation range on the object side is φ1.1 [mm].

The tube lens 23 forms a primary image of sample Sm by focusing light from the objective. The relay optical system 24, which projects the primary image formed by the objective and the tube lens 23 onto the image sensor 31, includes a front group 24a and a rear group 24b. The aperture stop 25 is an adjustable aperture stop located at a pupil-conjugate position between the front group 24a and the rear group 24b. The numerical aperture of the objective can be limited by changing the aperture diameter of the aperture stop 25. Note that a pupil-conjugate position refers to a position optically conjugate to the pupil position of an objective.

The imaging optical system 20 forms, within the image sensor 31 included in the imaging apparatus 30, an optical image of a visual-field region. This will be described hereinafter in detail. Note that the visual-field region is a region within an object surface that corresponds to the OFN of the objective.

The imaging apparatus 30 is a digital camera that includes the image sensor 31. The image sensor 31 is, for example, a charge coupled device (CCD) image sensor or a complementary metal oxide semiconductor (CMOS) image sensor. The image sensor 31 is rectangular-shaped. The image sensor 31 converts the optical image formed by the imaging optical system 20 into an electric signal. The imaging apparatus 30 acquires a captured image on the basis of the electric signal and outputs this captured image to the control apparatus 40.

For example, in addition to performing the analog-digital conversion for converting an analog signal output from the image sensor 31 into a digital signal so as to generate RAW data, the imaging apparatus 30 may acquire a captured image by performing image processing such as OB (Optical Black) subtraction, WB (White Balance) correction, or demosaicing. Note that a captured image is an image of a region within an object surface onto which an image of the image sensor 31 is projected when a light ray is inversely traced from the image sensor 31 to the object surface. Meanwhile, a region within an object surface onto which an image of the image sensor 31 is projected when a light ray is inversely traced from the image sensor 31 to the object surface is referred to as an imaging region.

The control apparatus 40 controls operations of the imaging system 1. For example, the control apparatus 40 may control the driving of the stage 11, control the image capturing performed by the imaging apparatus 30, and perform image processing of a captured image. For example, the control apparatus 40 may be a standard computer such as that depicted in FIG. 4.

FIG. 4 illustrates the hardware configuration of the control apparatus 40. As depicted in FIG. 4, the control apparatus 40 includes a processor 41, a memory 42, an input-output interface 46, a network interface 47, and a bus 48. The control apparatus 40 may further include a recording medium 43 and a transportable-recording-medium driving apparatus 44 accommodating a transportable recording medium 45. The memory 42, the recording medium 43, and the transportable recording medium 45 are each an example of a non-transitory computer-readable storage medium storing a program.

The processor 41 is, for example, an arbitrary processing circuit that includes a central processing unit (CPU). The processor 41 performs programmed processing by running a program stored in the memory 42 or the recording medium 43. The memory 42 is a working memory of the processor 41. The memory 42 is an arbitrary semiconductor memory such as a random access memory (RAM). The recording medium 43 is a nonvolatile memory such as an erasable programmable ROM (EPROM ROM) or a hard disc drive.

The transportable-recording-medium driving apparatus 44 may output data stored in the memory 42 or the recording medium 43 to the transportable recording medium 45 and read a program and data from the transportable recording medium 45. The transportable recording medium 45 is an arbitrary recording medium that can be carried. The transportable recording medium 45 includes, for example, an SD card, a universal serial bus (USB) flash memory, a compact disc (CD), and a digital versatile disc (DVD).

The input-output interface 46 exchanges information with external apparatuses (e.g., microscope apparatus 10, display apparatus 50, input apparatus 60). For example, the input-output interface 46 may acquire a captured image output from the imaging apparatus 30. The input-output interface 46 may output an instruction to control the driving of the stage 11 or an instruction to control the image capturing performed by the imaging apparatus 30 to the microscope apparatus 10.

The network interface 47 receives/transmits information from/to the network. A network interface card (NIC) or a wireless local area network (LAN) card may be used as the network interface 47. The bus 48 connects the processor 41, the memory 42, and the recording medium 43 in a manner such that data can be communicated between these components.

The configuration depicted in FIG. 4 is an example of the hardware configuration of the control apparatus 40. The control apparatus 40 is not limited to this configuration. The control apparatus 40 may be a general-purpose apparatus or a dedicated apparatus.

The display apparatus 50 is, for example, a liquid crystal display, an organic EL (OLED) display, or a cathode ray tube (CRT) display.

The input apparatus 60 outputs an operation signal that depends on a user operation to the control apparatus 40. The input apparatus 60 is, for example, a keyboard but may include a mouse, a joystick, a touch panel, and a stylus.

The recording apparatus 80 is an online storage server that can be accessed over the network 70. The recording apparatus 80 may be a storage region provided by a cloud storage service. The network 70 is, for example, the Internet but may be another network such as a dedicated line.

In the imaging system 1 configured as described above, the control apparatus 40 first acquires a plurality of captured images by controlling the stage 11 and the imaging apparatus 30. The plurality of captured images are images of a plurality of different regions within an object surface. Then, by piecing together a plurality of constituent images included in the plurality of captured images that have been acquired, the control apparatus 40 constructs a wide region image that is an image of a region wider than a visual-field regions. Accordingly, the constituent images are components of, i.e., included in, the wide region image. Each of the plurality of constituent images is a portion of each of the plurality of captured images acquired by the imaging apparatus 30 and is also at least a portion of each of images of a plurality of visual-field regions. A plurality of optical-axis positions of the objective 21 that correspond to the images of the plurality of visual-field regions are different from each other. Accordingly, in comparison with the conventional system, the imaging system 1 allows reduction of the time required to construct a wide region image while maintaining a high image quality, thereby improving the throughput. Reasons for this will be described in the following in detail.

FIGS. 5A and 5B illustrate a relationship between the image sensor 91 and the image circle 92 in the conventional imaging system. In the conventional imaging system, the image circle 92 is typically formed to cover the entirety of the image sensor 91, as depicted in FIG. 5A. The image circle 92 is an optical image of the visual-field region 201. The visual-field region 201 is a region within an object surface that corresponds to the OFN of the objective. Hence, the imaging region 200 on the object side is typically provided within the visual-field region 201, as depicted in FIG. 5B. Note that the diameter of a visual-field region is referred to as a field of view (FOV).

The quality of an optical image that can be captured for the visual-field region 201 is more preferable than that of an optical image that can be captured for a region located outside the visual-field region 201. Accordingly, by providing the imaging region 200 within the visual-field region 201, a captured image that has a high quality for a range from the center to the edge portions can be acquired. Accordingly, the conventional imaging system allows the entirety of captured images acquired by the microscope apparatus to be used efficiently in constructing a wide region image by piecing together the plurality of images.

Meanwhile, providing the rectangular imaging region 200 within the circular visual-field region 201 will decrease the efficiency of use of the visual-field region 201. That is, a region for which a high-quality optical image can be acquired in image shooting cannot be used effectively. Hence, the number of times image shooting is performed will be increased, with the result that a long time will be required to construct a wide region image.

FIGS. 6A and 6B illustrate a relationship between the image sensor 31 and the image circle 32 in the imaging system 1. The imaging system 1 is such that the imaging optical system 20 forms the image circle 32 within the image sensor 31, as depicted in FIG. 6A. The image circle 32 is an optical image of the visual-field region 101 that is region within an object surface that corresponds to the OFN of the objective 21. Hence, the visual-field region 101 on the object side is provided within the imaging region 100, as depicted in FIG. 6B.

Forming the image circle 32 within the image sensor 31 allows the entirety of the visual-field region 101 to be imaged. Accordingly, a region for which a high-quality optical image can be acquired in image shooting can be used effectively. Hence, images of regions required to construct a wide region image can be acquired by performing image shooting only a small number of times, with the result that a wide region image can be constructed in a shorter time than in the conventional system.

The control apparatus 40 of the imaging system 1 constructs a wide region image by piecing together a plurality of constituent images. Each of the plurality of constituent images is at least a portion of an image of a visual-field region and thus has a high quality. The wide region image is constructed by piecing together a plurality of high-quality constituent images and thus has a high quality.

In the imaging system 1, as described above, the imaging optical system 20 forms the image circle 32 within the image sensor 31, and the control apparatus 40 constructs a wide region image by piecing together a plurality of constituent images, so that the time required for image construction can be reduced while maintaining a high image quality, thereby improving the throughput.

When the imaging system 1 uses an image sensor that is equal to the conventional image sensor in size, an optical image of a visual-field region is projected onto the imaging apparatus 30 at a magnification lower than that in the conventional imaging system so as to form an image circle within the image sensor. In this case, it will be desirable to decrease the projection magnification by using the relay optical system 24 that has a relay magnification lower than that in the conventional system, rather than by using an objective that has a lower magnification than that in the conventional system. Alternatively, when the imaging optical system 20 does not include the relay optical system 24, it may be desirable to decrease the projection magnification by designing a shorter focal length of the tube lens 23 than that in the conventional system.

Accordingly, the projection magnification can be decreased while using an objective having the same magnification as that in the conventional imaging system so that a high resolution can be maintained without decreasing the numerical aperture. Hence, the imaging system 1 allows the throughput to be improved while ensuring the resolution required for a pathological examination or the like.

It will be more desirable when the magnification of the relay optical system 24 can be adjusted in accordance with the size of the image sensor 31. Hence, the relay optical system 24 will desirably be a zoom optical system. Alternatively, the relay optical system 24 may desirably be provided within the imaging optical system 20 in a manner such that the relay optical system 24 can be switched with another relay optical system that has a different relay magnification by, for example, a switching mechanism such as a slider.

To allow the imaging system 1 to effectively use a region for which a high-quality optical image can be acquired in image shooting, it will be desirable that widest possible ranges of an image of a visual-field region be used for the piecing process, in addition to imaging the entirety of the visual-field region. To allow a plurality of constituent images for construction of a wide region image to maintain a constant quality, it will be desirable that the plurality of constituent images have the same shape as much as possible.

Accordingly, the plurality of constituent images will desirably be a plurality of images assuming honeycomb-cell shapes. When the constituent images have honeycomb-cell shapes, a wide region image having a homogeneous honeycomb structure can be constructed using a wide range of an image of a circular visual-field region. However, as long as the plurality of constituent images can be pieced together with no gaps therebetween, the images may have another shape.

The honeycomb-cell shape may be a regular hexagonal shape. A regular hexagon is a regular polygon that is the closest to a circle among the regular polygons that can be tessellated. When constituent images have regular hexagonal shapes, an image of a visual-field region can be used more effectively than in a situation in which constituent images have other regular polygon shapes that can be tessellated (regular triangles, squares). For example, an image that corresponds to a regular hexagonal region 33 (constituent image region 102 inscribed in the visual-field region 101) inscribed in the image circle 32 within a captured image as depicted in FIG. 6 may be defined as a constituent image.

Figure 7:
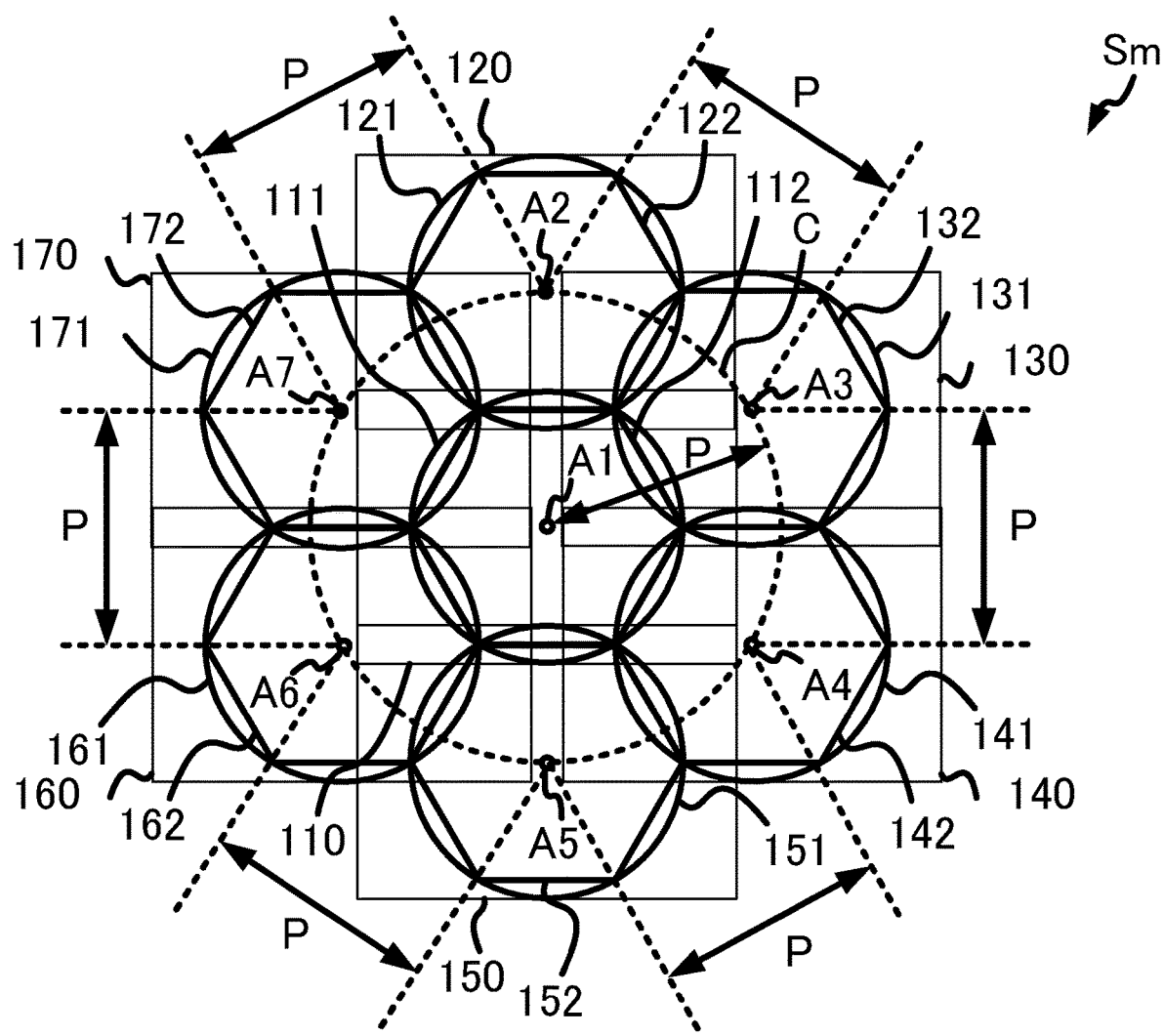
FIG. 7 illustrates a relationship between the positions of a plurality of captured images.

Let one constituent image of a plurality of constituent images each having a honeycomb-cell shape be a first constituent image. Let six constituent images of the plurality of constituent images that surround the first constituent image be six second constituent images. Let the optical-axis position of the objective at the time of acquiring a captured image that includes the first constituent image as a portion thereof be a first position. In this case, the imaging apparatus 30 may acquire each of the six captured images by performing image capturing under a condition in which, as depicted in FIG. 7, the optical axis is located at each of six second positions equally distant from the first position, i.e., the optical-axis position at the time of acquiring a captured image that includes the first constituent image as a portion thereof. Each of the six second constituent images described above is a portion of each of these six captured images.

It will also be desirable that the first position be equally distant from each of the six second positions.

FIG. 7 illustrates a relationship between the positions of a plurality of captured images. FIG. 7 indicates positional relationships between an imaging region 110 that corresponds to the captured image that includes the first constituent image and imaging regions (imaging regions 120, 130, 140, 150, 160, and 170) that correspond to six captured images that include the six second constituent images. An imaging position A1 is an optical-axis position at the time of acquiring the captured image that includes the first constituent image, i.e., the first position. Imaging positions A2-A7 are optical-axis positions at the times of acquiring the captured images that include the six second constituent images, i.e., the six second positions. As depicted in FIG. 7, the imaging positions A2-A7 are arranged at equal intervals (distance P) on a circle C with radius P that is centered at the imaging position A1. Constituent image regions 112-172 respectively inscribed in visual-field regions 111-171 are arranged on an object surface with no gaps therebetween. Three imaging positions (e.g., imaging positions A1, A2, and A3) associated with three constituent image regions adjacent to each other are located at the individual vertexes of an equilateral triangle.

Accordingly, when the centers of the six captured images that include the six second constituent images are equally distant from the center of the first constituent image, the honeycomb-cell shape, i.e., the shape of each constituent image, does not need to assume a regular hexagonal shape. This is because as long as such a condition is satisfied, a high degree of freedom of movement and efficient scanning suitable to the shape of a subject can be achieved, as in a situation in which constituent images each assume a regular hexagonal shape. Note that the degree of freedom of movement and the efficient scanning will be described hereinafter in detail.

Figure 8:
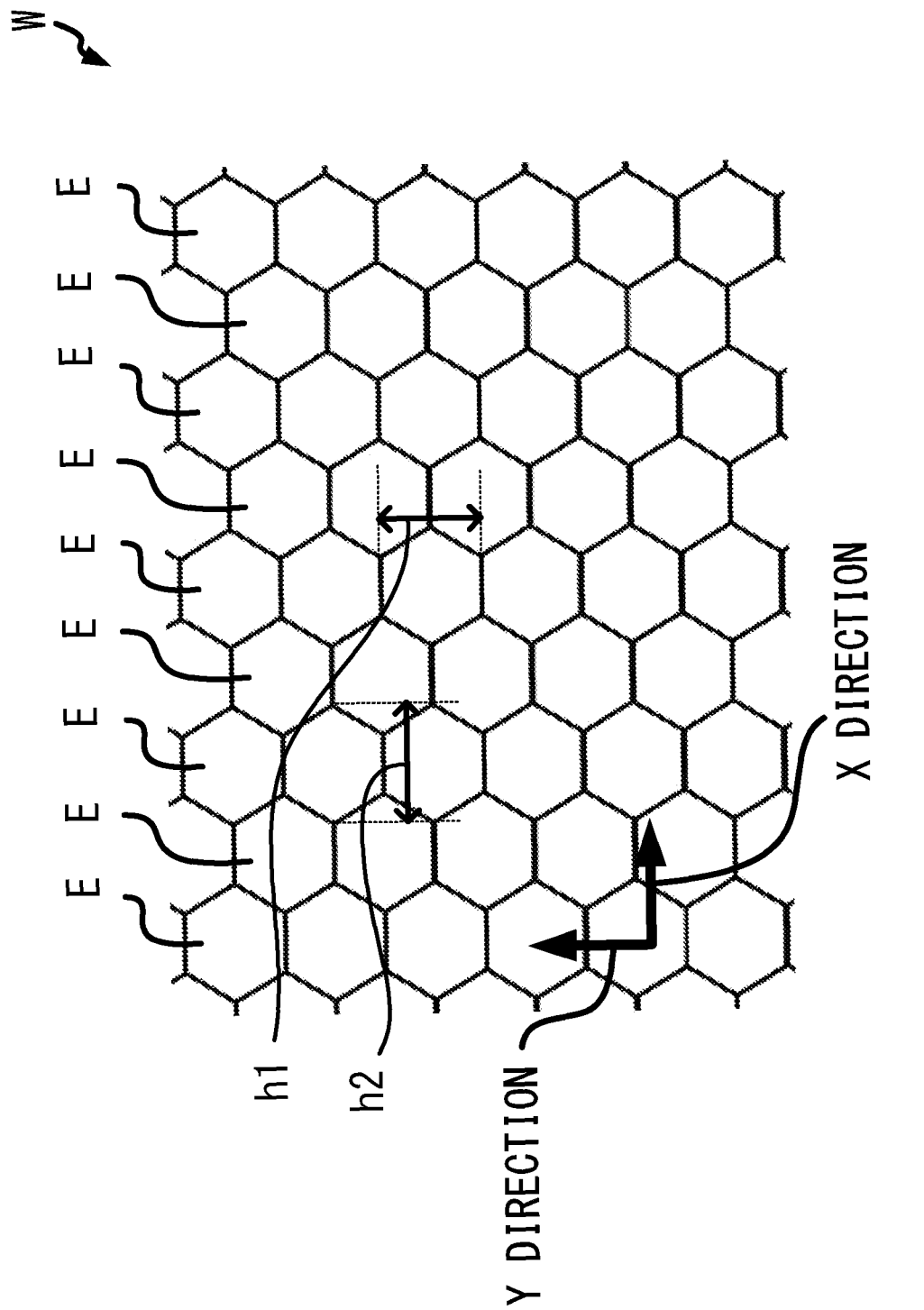
FIG. 8 illustrates the arrangement of constituent images E within a wide region image W.

FIG. 8 illustrates the arrangement of constituent images E within a wide region image W. The imaging system 1 can form, as depicted in FIG. 8, a wide region image W by piecing together constituent images E having honeycomb-cell shapes, thereby achieving both a high image quality and a high throughput.

The control apparatus 40 of the imaging system 1 calculates piecing positions and, at these piecing positions, pieces together a plurality of constituent images into a honeycomb shape with no gaps therein. However, the method of calculating piecing positions is not particularly limited to a certain method. The piecing positions may be calculated on the basis of coordinate information identified by output from an encoder of the microscope apparatus 10. Alternatively, the piecing positions may be calculated on the basis of a captured image acquired by the microscope apparatus 10. In this case, for example, a matching technique using sum of absolute differences (SAD), sum of squared differences (SSD), normalized cross correlation (NCC), or phase-only correction (POC) as an evaluation function may be used.

Figure 9:
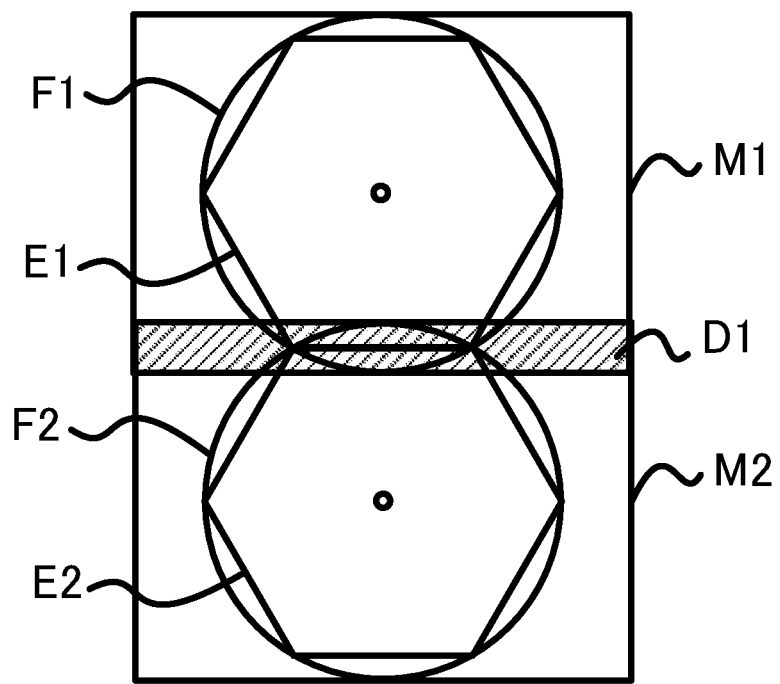
FIG. 9 illustrates an example of a method of piecing together constituent images.
Figure 10:
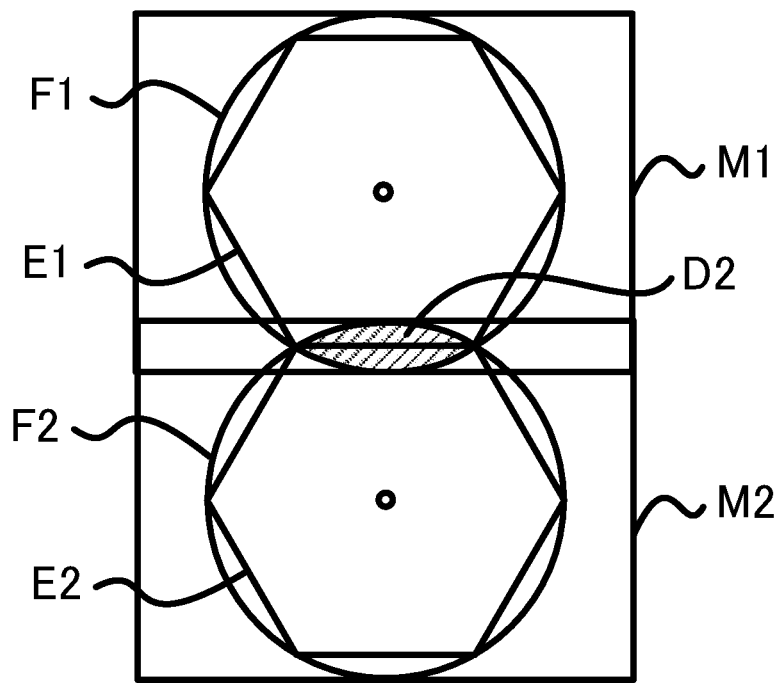
FIG. 10 illustrates another example of a method of piecing together constituent images.
Figure 11:
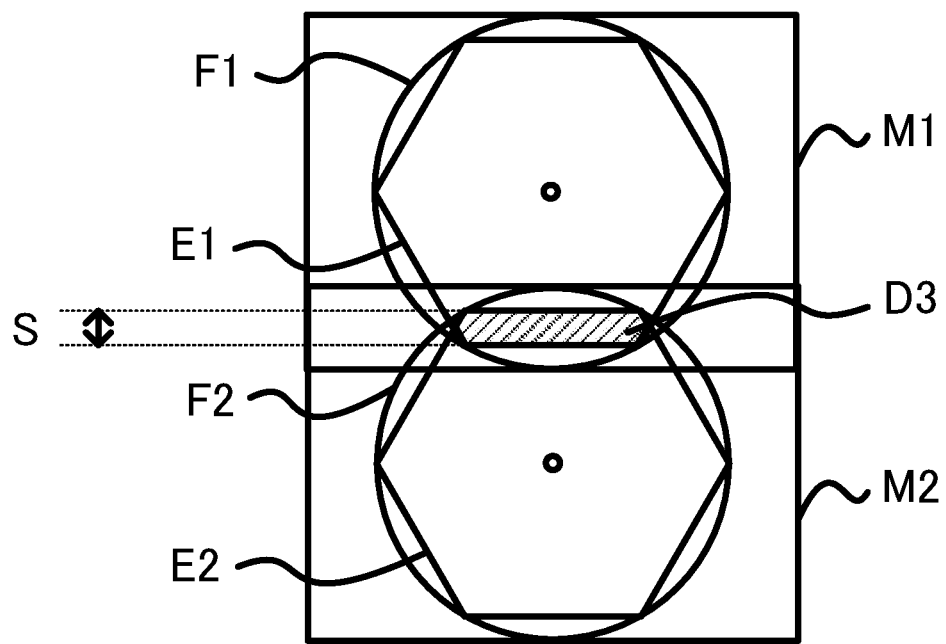
FIG. 11 illustrates still another example of a method of piecing together constituent images.
Figure 12:
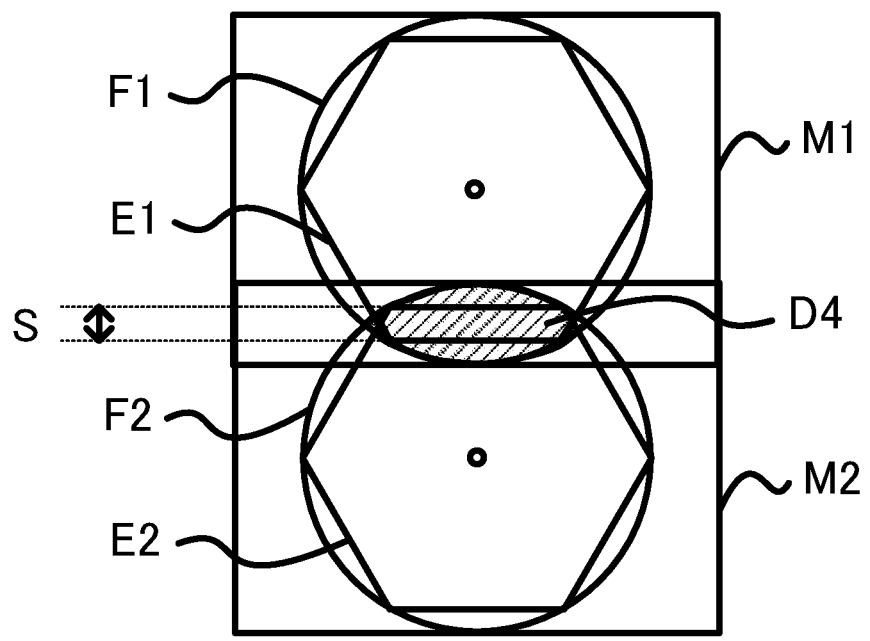
FIG. 12 illustrates yet another example of a method of piecing together constituent images.

When piecing positions are determined using the matching technique, portions of a captured image that are used for the matching are not particularly limited to certain portions. For example, the control apparatus 40 may determine, as depicted in FIG. 9, a piecing position on the basis of an overlap D1 between two captured images (captured images M1 and M2) that include two constituent images (constituent images E1 and E2) to be pieced together. Alternatively, as depicted in FIG. 10, a piecing position may be determined on the basis of an overlap D2 between two visual-field images (visual-field images F1 and F2) that is included in the overlap D1. In the examples depicted in FIGS. 9 and 10, a piecing position can be determined even though the two constituent images (constituent images E1 and E2) to be pieced together have no overlaps therebetween, so that images of regions that are required to construct a wide region image can be acquired in a shorter time. In addition, when the two constituent images partially overlap each other, a piecing position may be determined, as depicted in FIG. 11, on the basis of an overlap D3 between the two constituent images that is included in the overlap D1. Alternatively, when the two constituent images partially overlap each other as depicted in FIG. 12, a piecing position may be determined on the basis of an overlap D4 between the two visual-field images.

The following describes conditional expressions that are desirably satisfied by the imaging system 1.

When the image sensor 31 has a rectangular shape and the honeycomb-cell shape is a regular hexagonal shape, the imaging system 1 desirably satisfies the following conditional expression (1), where H indicates the length of the diagonal of the regular hexagonal regions on the image sensor 31, the regular hexagonal regions each corresponding to each of a plurality of constituent images, and D indicates the length of a shorter edge of the image sensor 31.

$$0.75 \leq H/D \leq 1.2 \quad (1)$$

By satisfying conditional expression (1), an image of a visual-field region can be used effectively. When H/D is less than a lower limit, a constituent image region becomes excessively small relative to the visual-field region. When H/D is greater than an upper limit, an optical image of the constituent image region becomes excessively large relative to the image sensor 31.

It will be more desirable that the imaging system 1 satisfy the following conditional expressions (2) and (3) in addition to conditional expression (1), where P indicates the distance between the first and each of the second positions, M indicates the magnification of the imaging optical system 20, and S indicates the length of an overlap between a region within an object surface that corresponds to the first constituent image and a region within the object surface that corresponds to each of the second constituent images, the length extending along a line linking the first and each of the second positions (see FIGS. 11 and 12).

$$P = \frac{\sqrt{3}}{2} \times \frac{H}{M} - S \quad (2)$$

$$0.7 \leq \frac{\left(\frac{H}{M} - S\right)}{\left(\frac{H}{M}\right)} \leq 1 \quad (3)$$

When conditional expressions (2) and (3) are satisfied, the overlap region has an appropriate length S. This prevents excessively many images of the overlap region from being shot while ensuring the accuracy in the piecing, thereby decreasing the number of times image shooting is performed. When (H/M−S)/(H/M) is less than a lower limit, the constituent images overlap each other to an excessively high degree, and hence the number of times image shooting is performed is increased. When (H/M−S)/(H/M) is greater than an upper limit, the constituent images have a gap therebetween.

The following describes a procedure for an image construction process performed by the imaging system 1.

Figure 13:
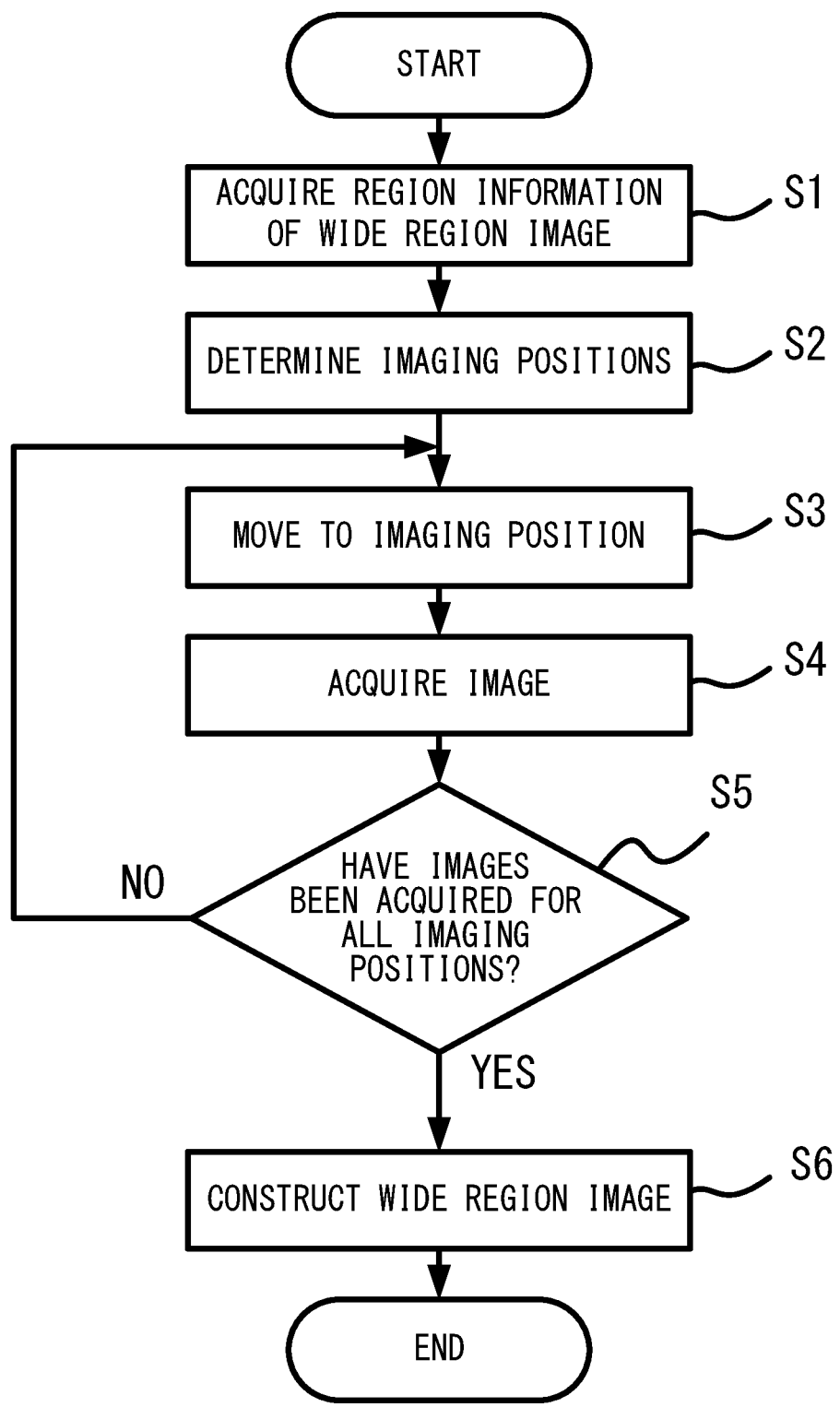
FIG. 13 illustrates an example of a flowchart of an image construction method.

FIG. 13 illustrates an example of a flowchart of an image construction method implemented by the imaging system 1. For example, the process depicted in FIG. 13 may be started when the user of the imaging system 1 operates the input apparatus 60 and the processor 41 of the control apparatus 40 runs a predetermined application program.

The control apparatus 40 acquires region information of a region to be imaged as a wide region image (hereinafter simply referred to as region information of the wide region image) (step S1). For example, the user may designate a region on a sample Sm by using the input apparatus 60, and the control apparatus 40 may acquire information on the region designated by the user as region information of a region to be imaged as a wide region image.

The control apparatus 40 determines imaging positions (step S2). In this example, a plurality of imaging positions for constructing a wide region image are determined on the basis of the region information acquired in step S1. For example, the imaging positions may be determined such that conditional expressions (2) and (3) are satisfied.

The control apparatus 40 controls the stage 11 and the imaging apparatus 30 with an optical image of a visual-field region formed within the image sensor 31 by the imaging optical system 20, so as to repeatedly perform a process in which the stage 11 moves to each individual imaging position determined in step S2 and the imaging apparatus 30 acquires a captured image (steps S3-S5). Accordingly, the control apparatus 40 acquires a plurality of captured images.

The control apparatus 40 constructs a wide region image by using the plurality of captured images that have been acquired (step S6). More particularly, a wide region image is constructed by piecing together a plurality of constituent images having honeycomb-cell shapes that are included in the plurality of captured images.

Figure 14:
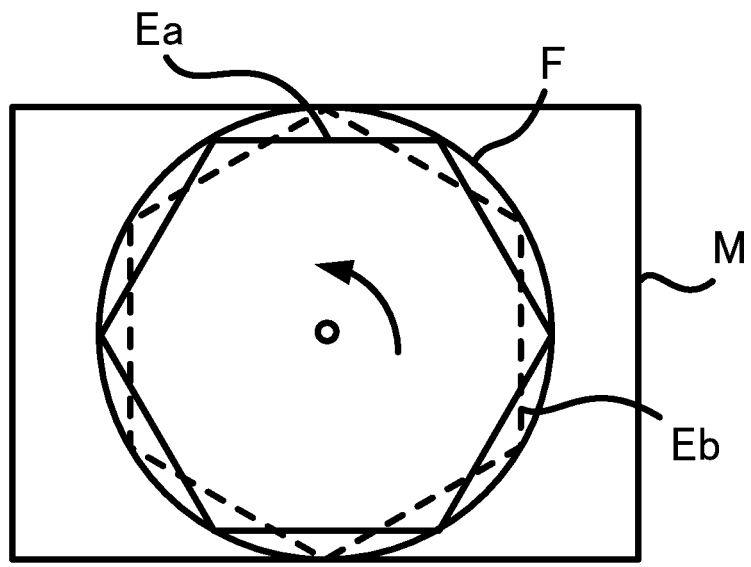
FIG. 14 illustrates the orientations of constituent images within a captured image.

In the example described above, a regular hexagonal region that corresponds to the constituent image has a diagonal parallel to the longer edge of the image sensor 31, as depicted in, for example, FIG. 6. However, the orientation of the regular hexagonal shape is not limited to this. The control apparatus 40 may use a constituent image Eb that has, as depicted in, for example, FIG. 14, a diagonal parallel to the shorter edge of a captured image M, rather than a constituent image Ea that has a diagonal parallel to the longer edge of the captured image M.

The control apparatus 40 may determine an orientation for the regular hexagonal shape in accordance with the shape of a region to be imaged. More particularly, the control apparatus 40 may determine an orientation for the regular hexagonal shape such that the number of constituent image regions to cover the entirety of the region to be imaged becomes as small as possible. Hence, the number of times image shooting is performed can be decreased, thereby improving the throughput.

Figure 15:
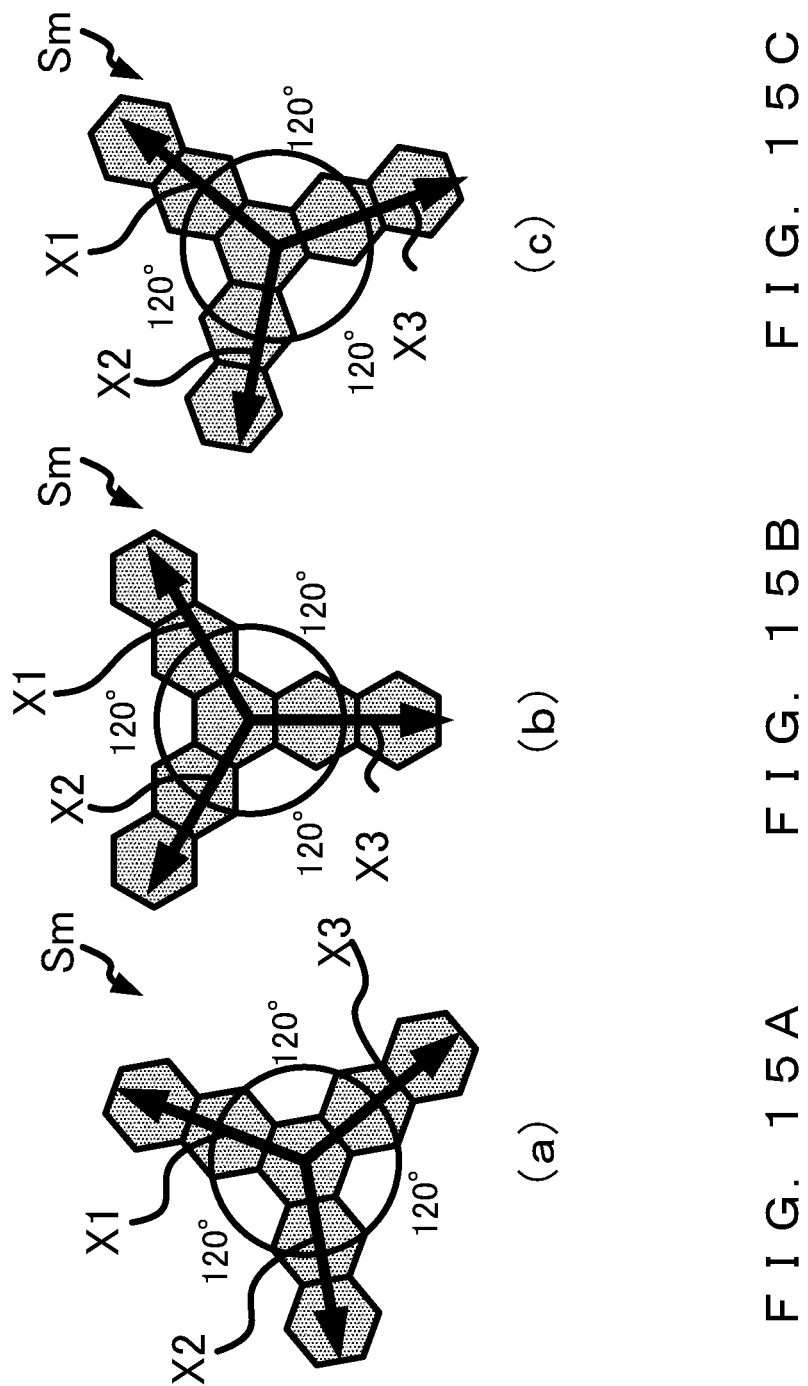
FIGS. 15A-15C each illustrate a relationship between the orientation of constituent images and a direction in which the constituent images are pieced together.

The imaging system 1 that uses constituent images having honeycomb-cell shapes (including regular hexagonal shapes) has a degree of freedom of 3 for the piecing direction, thereby achieving a higher degree of freedom than that of the conventional imaging system that uses rectangular constituent images. Hence, unnecessary movement of the stage 11 can be decreased in scanning a region to be imaged. In addition, the unnecessary movement can be further decreased by changing the orientation of honeycomb-cell shapes (including regular hexagonal shapes), as depicted in FIGS. 15A-15C. Decreasing unnecessary movement allows quick movement to imaging positions so that necessary images can be acquired in a shorter time. This can contribute to the improvement of the throughput. Note that directions X1-X3 depicted in FIGS. 15A-15C each indicate a piecing direction.

Figure 16:
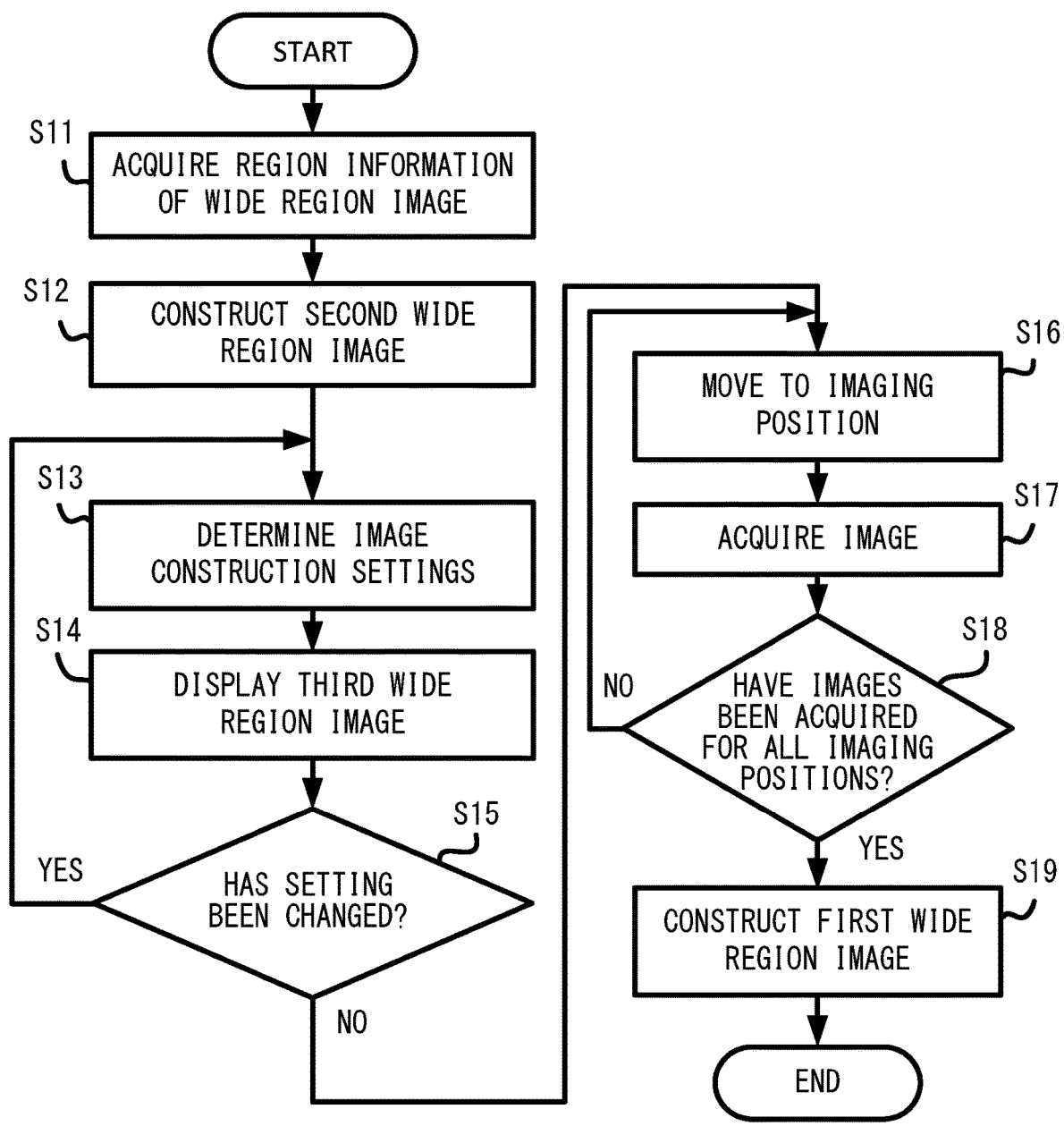
FIG. 16 illustrates another example of a flowchart of an image construction method.

As described above, the orientation of the honeycomb-cell shape can largely affect the throughput of the imaging system 1. Accordingly, as depicted in FIG. 16, the imaging system 1 may rapidly construct a wide region image at the expense of the image quality to some degree and determine settings, including the orientation of the honeycomb-cell shape, on the basis of the wide region image. Then, a higher-quality wide region image may be constructed in accordance with the settings that have been determined. In the following descriptions, a wide region image constructed at the expense of the image quality to some degree will be referred to as a second wide region image, and a wide region image of a higher quality than the second wide region image will be referred to as a first wide region image.

Figure 17:
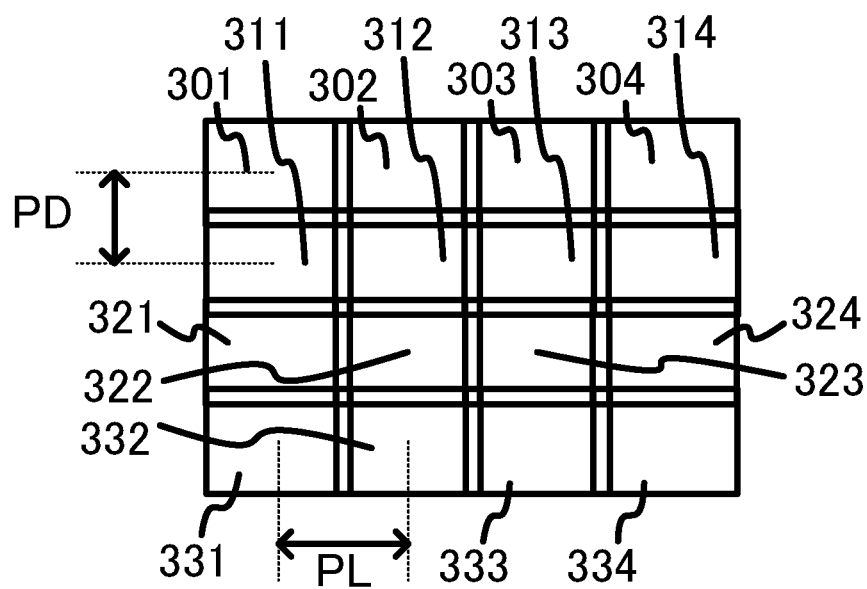
FIG. 17 illustrates a relationship between the positions of a plurality of second captured images.
Figure 18:
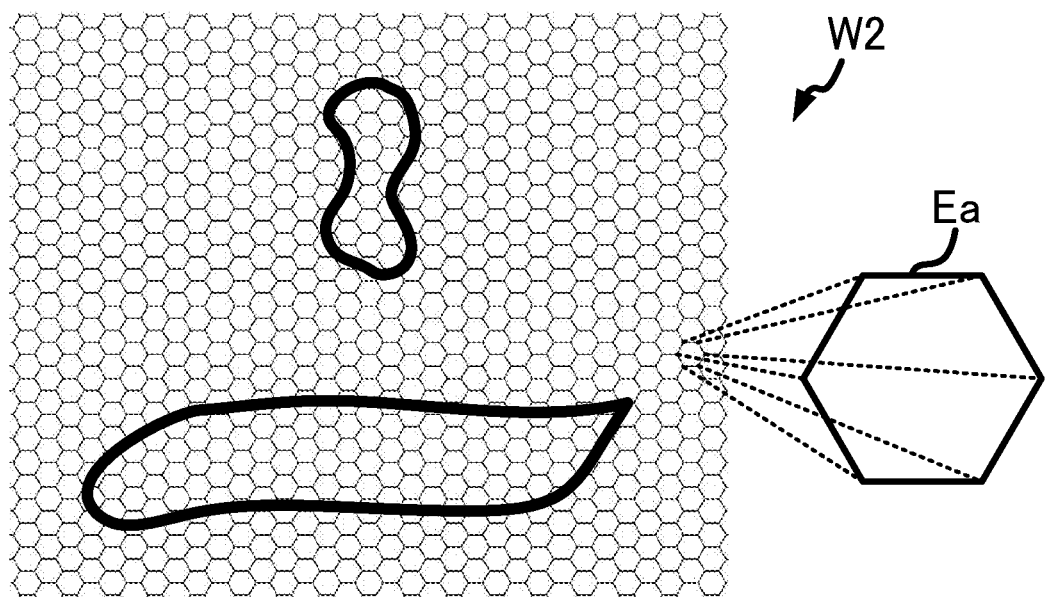
FIG. 18 illustrates an example of how a third wide region image is displayed.
Figure 19:
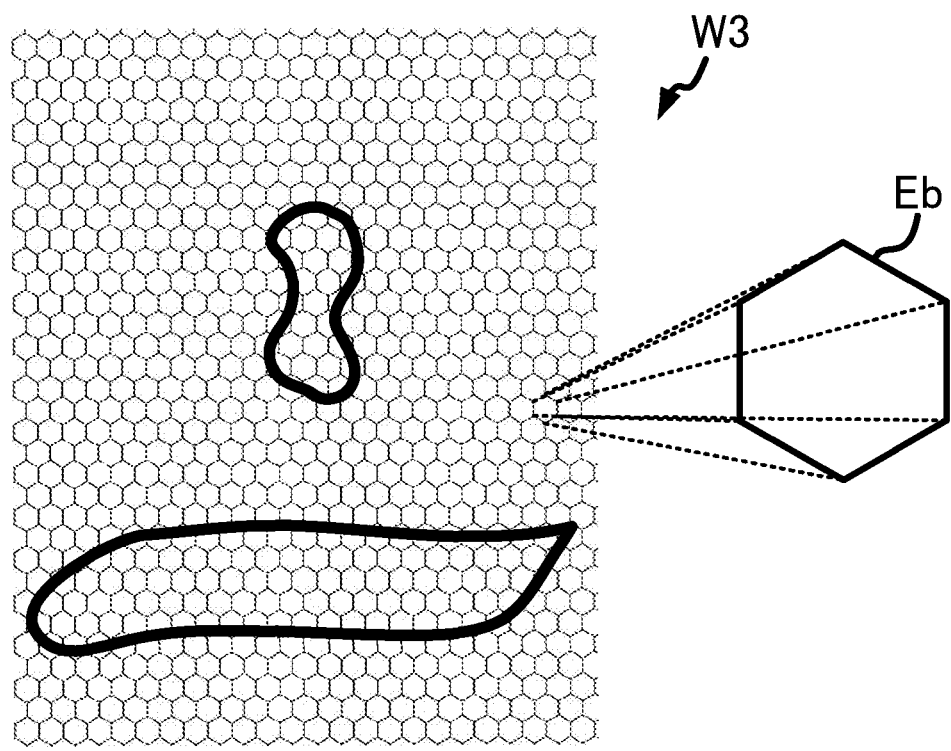
FIG. 19 illustrates another example of how a third wide region image is displayed.

FIG. 16 illustrates another example of a flowchart of an image construction method. FIG. 17 illustrates a relationship between the positions of a plurality of second captured images. FIG. 18 illustrates an example of how a third wide region image is displayed. FIG. 19 illustrates another example of how a third wide region image is displayed. For example, the process depicted in FIG. 16 may be started when the user of the imaging system 1 operates the input apparatus 60 and the processor 41 of the control apparatus 40 runs a predetermined application program.

The bold solid lines depicted in FIGS. 18 and 19 and the portions surrounded by these lines indicate objects to be observed, such as cells, i.e., regions to be imaged.

The control apparatus 40 acquires region information of a region to be imaged as a second wide region image (hereinafter simply referred to as region information of a wide region image) (step S11). This process is similar to step S1 in FIG. 13.

The control apparatus 40 constructs a second wide region image (step S12). In this example, the control apparatus 40 controls the stage 11 and the imaging apparatus 30 with an optical image of a visual-field region formed within the image sensor 31 by the imaging optical system 20, so as to acquire a plurality of second captured images and construct a second wide region image by piecing together the plurality of second captured images that have been acquired. Using the entirety of each of the plurality of second captured images having rectangular shapes, the second wide region image can be constructed by performing image shooting only a small number of times.

In step S12, the control apparatus 40 desirably satisfies the following conditional expressions (4) and (5), where PD indicates the distance between optical-axis positions at the times of acquiring two second captured images adjacent to each other, as depicted in FIG. 17, in a direction parallel to the shorter edge of the image sensor 31, and PL indicates the distance between optical-axis positions at the times of acquiring two second captured images adjacent to each other, as depicted in FIG. 17, in a direction parallel to the longer edge of the image sensor 31. Note that regions 301-334 depicted in FIG. 17 indicate captured image regions.

$$0.5D/M \leq PD \leq D/M \quad (4)$$

$$0.5L/M \leq PL \leq L/M \quad (5)$$

Satisfying conditional expressions (4) and (5) allows the second wide region image to be constructed by efficiently shooting images of regions required for the second wide region image. When at least one of PD and PL is less than a lower limit, the captured images overlap each other to an excessively high degree, and hence the number of times image shooting is performed is increased. When at least one of PD and PL is greater than an upper limit, the captured images have gaps therebetween.

The second wide region image includes images of regions outside the visual-field region, and hence the image quality or brightness of the edge portions thereof could be insufficient. Thus, the image quality and the brightness may be adjusted by performing a shading correction or other types of image processing.

The control apparatus 40 determines image construction settings on the basis of the second wide region image constructed in step S12 (step S13). The image construction settings are settings for constructing a first wide region image and include at least a plurality of imaging positions, the orientation of the honeycomb-cell shape, and an order in which the plurality of imaging positions are reached for image shooting. In step S13, for example, under a condition in which the number of times image shooting is performed is minimized, the control apparatus 40 may determine a plurality of imaging positions, the orientation of the honeycomb-cell shape, and an order in which the plurality of imaging positions are reached for image shooting.

The control apparatus 40 causes the display apparatus 50 to display a third wide region image (step S14). In this example, the third wide region image is constructed by overlaying the contours of constituent images that are to constitute a first wide region image to be constructed in step S19 (this step will be described hereinafter) to the second wide region image constructed in step S12, and then the third wide region image is displayed on the display apparatus 50. The number of the constituent images may be displayed together with the third wide region image. The contours of the constituent images are uniquely determined by the image construction settings in step S13. FIG. 18 depicts a third wide region image W2 provided when the lateral orientation has been determined for the honeycomb-cell shapes. FIG. 19 depicts a third wide region image W3 provided when the longitudinal orientation has been determined for the honeycomb-cell shapes.

The control apparatus 40 determines whether the user has made a change to the image construction settings (step S15). For example, the user may change the orientation of the constituent images displayed within the third wide region image by rotating the contours of the constituent images. Further, the number of the constituent images may be recalculated in consideration of a change in the orientation of the constituent images, and the calculation result may be displayed. When the user has performed such an operation, the control apparatus 40 determines that a change has been made to the image construction settings and repeats the processes of steps S13-15. When determining that no changes have been made to the image construction settings, the control apparatus 40 performs the processes of steps S16-S19 in accordance with the image construction settings determined in step S13. Note that the processes of steps S16-S19 are similar to those of steps S3-S6 in FIG. 13.

In the example indicated above, the second wide region image is constructed using the objective 21, which is also used to construct the first wide region image. However, the second wide region image may be constructed using the objective 22 that has a magnification lower than that of the objective 21. In this case, the second wide region image can be constructed by performing image shooting fewer times. Also when the second wide region image is constructed using the objective 21, the wide region image can be constructed by performing image shooting fewer times than in the conventional imaging system. This is because a captured image is acquired with an optical image of a visual-field region formed within the image sensor 31 by the imaging optical system 20. When, for example, an image sensor having a rectangular shape of 3:4 is used, a region for which an image can be acquired when image shooting is performed once will be about 2.8 times wider than that in the conventional imaging system.

When the first wide region image is constructed using the objective 21 and the second wide region image is constructed using the objective 22, the imaging system 1 desirably satisfies the following conditional expressions (6) and (7), where NA10 indicates the maximum numerical aperture of the objective 21, NA20 indicates the maximum numerical aperture of the objective 22, NA1 indicates the numerical aperture of the objective 21 limited by the aperture stop 25 when a captured image is acquired using the objective 21, and NA2 indicates the numerical aperture of the objective 22 limited by the aperture stop 25 when a second captured image is acquired using the objective 22.

$$0.3 < NA2/NA20 < 1 \quad (6)$$

$$NA2 < NA1 \leq NA10 \quad (7)$$

By satisfying conditional expression (6), the aperture efficiency in using the objective 22 can be improved, thereby leading to an improved off-axis performance and improved peripheral illumination. When conditional expression (7) is satisfied, the numerical aperture in constructing the first wide region image is higher than that in constructing the second wide region image so that the first wide region image can have a high resolution. By limiting the numerical aperture of the objective 21 in accordance with, for example, the size of the image sensor 31 while satisfying conditional expression (7), a first wide region image of a higher quality can be constructed.

In addition, the imaging system 1 may satisfy the following conditional expressions, where λ indicates the wavelength of light incident on the image sensor 31, NAI indicates the numerical aperture of the image side of the imaging optical system 20, k indicates the pixel pitch of the image sensor 31, and M indicates the magnification of the imaging optical system 20. M=FTL/FOB may be satisfied, where FTL indicates the focal length of an optical system consisting of the tube lens 23 and the relay optical system 24, and FOB indicates the focal length of the objective 21.

$$2 \leq (1.22 \times \lambda / NAI)/k \leq 10 \quad (8)$$

$$0.1 \leq k/M \leq 0.25 \quad (9)$$

The number of pixels that can be disposed within a range defined by the size of a diffracted image is important for achieving a higher image quality. When conditional expression (8) is satisfied, a sufficient number of pixels are disposed within a diffraction diameter range so that a high image quality can be achieved. When (1.22×λ/NAI)/k is less than a lower limit, a sufficient image quality cannot be achieved since a sufficient number of pixels are not disposed within the diffraction diameter range. When (1.22×λ/NAI)/k is greater than an upper limit, the pixel number is excessively high, and a sufficient throughput cannot be achieved because a long time will be required for image processing and data transfers.

When conditional expression (9) is satisfied in addition to conditional expression (8), an appropriate relationship is established between the magnification and the pixel number in constructing a first wide region image so that a high image quality and a high throughput can be achieved. When k/M is less than a lower limit, the pixel number is excessively high, and a sufficient throughput cannot be achieved because a long time will be required for image processing and data transfers. When k/M is higher than an upper limit, the pixel number is insufficient, resulting in a reduced quality of the first wide region image.

Finally, specific numerical data will be disclosed as examples for the imaging system described above. FIGS. 20 and 21 each illustrate a table indicating numerical data of individual examples for constructing a first wide region image. An objective with a 20-fold magnification is used in all of examples 1-1 to 1-9. FIG. 22 illustrates a table indicating numerical data of individual examples for constructing a second wide region image. An objective with a 4-fold magnification is used in all of examples 2-1 to 2-5. FIG. 23 illustrates a table indicating numerical data of reference examples for constructing a wide region image. Reference examples 1-4 depicted in FIG. 23 are each an example in which the conventional imaging system uses an objective with a 20-fold magnification. Reference examples 5-8 depicted in FIG. 23 are each an example in which the conventional imaging system uses an objective with a 4-fold magnification.

Image shooting is performed about 280-470 times in each of the examples depicted in FIG. 20 in which an objective with a 20-fold magnification is used. By contrast, image shooting is performed more than 500 times in each of the reference examples 1-4 depicted in FIG. 23 in which an objective with a 20-fold magnification is used. As is clear from comparisons between these examples, a first wide region image can be constructed in the examples of the present invention by performing image shooting fewer times than in the reference examples.

Image shooting is performed about 10 times in each of the examples depicted in FIG. 22 in which an objective with a 4-fold magnification is used. By contrast, image shooting is performed about 20 times in each of the reference examples 5-8 depicted in FIG. 23 in which an objective with a 4-fold magnification is used. As is clear from comparisons between these examples, a second wide region image can be constructed in the examples of the present invention by performing image shooting fewer times than in the reference examples.

What is claimed is:

1. An imaging system comprising:
    an imaging apparatus that includes an image sensor for converting an optical image into an electric signal and acquires a captured image based on the electric signal;
    an optical system that includes a first objective and that forms, within the image sensor, an optical image of a visual-field region, the visual-field region being a region within an object surface that corresponds to an objective field number (OFN) of the first objective;
    a motorized stage that moves the object surface with respect to an optical axis of the first objective; and
    a control apparatus that performs control to:
        acquire a plurality of captured images, the plurality of captured images being acquired by controlling the motorized stage and the imaging apparatus;
        define a plurality of constituent images within the plurality of captured images, each of the plurality of constituent images being a portion of a respective one of the plurality of captured images and also being at least a portion of a respective one of images of a plurality of visual-field regions; and
        construct a first wide region image by piecing together the plurality of constituent images, the first wide region image being an image of a region wider than the visual-field region,
    wherein:
    the plurality of captured images are images of a plurality of different regions within the object surface,
    a plurality of optical-axis positions of the first objective that correspond to the plurality of visual-field regions are different from each other,
    each of the plurality of constituent images has a honeycomb-cell shape which is a regular hexagonal shape,
    the image sensor has a rectangular shape,
    the control apparatus performs control such that the imaging apparatus acquires six captured images by performing image capturing under a condition in which the optical axis is located at each of six second positions equally distant from a first position, where one constituent image of the plurality of constituent images is defined as a first constituent image, six constituent images, of the plurality of constituent images, that surround the first constituent image are defined as six second constituent images, and an optical-axis position at a time of acquiring a captured image that includes the first constituent image as a portion thereof is defined as the first position,
    each of the six second constituent images is a portion of a respective one of the six captured images, and
    the imaging system satisfies the following conditional expression:

$$0.7 \leq H/D \leq 1.2 \tag{1}$$

where H indicates a length of a diagonal of regular hexagonal regions on the image sensor, each regular hexagonal region corresponding to a respective one of the plurality of constituent images, and D indicates a length of a shorter edge of the image sensor.

2. The imaging system of claim 1, wherein the control apparatus performs control to:
    calculate piecing positions based on the plurality of captured images, and
    piece together the plurality of constituent images at the calculated piecing positions.

3. The imaging system of claim 2, wherein:
    the control apparatus calculates the piecing positions based on the images of the plurality of visual-field regions, and
    the images of the plurality of visual-field regions are each a portion of a respective one of the plurality of captured images.

4. The imaging system of claim 1, wherein the imaging system satisfies the following conditional expressions:

$$P = \frac{\sqrt{3}}{2} \times \frac{H}{M} - S \tag{2}$$

$$0.7 \leq \frac{\left(\frac{H}{M} - S\right)}{\left(\frac{H}{M}\right)} \leq 1 \tag{3}$$

where P indicates a distance between the first and each of the second positions, M indicates a magnification of the optical system, and S indicates a length of an overlap between a region within the object surface that corresponds to the first constituent image and a region within the object surface that corresponds to each of the second constituent images, the length extending along a line linking the first and each of the second positions.

5. An imaging system comprising:
    an imaging apparatus that includes an image sensor for converting an optical image into an electric signal and acquires a captured image based on the electric signal;
    an optical system that includes a first objective and that forms, within the image sensor, an optical image of a visual-field region, the visual-field region being a region within an object surface that corresponds to an objective field number (OFN) of the first objective;
    a motorized stage that moves the object surface with respect to an optical axis of the first objective; and
    a control apparatus that performs control to:
        acquire a plurality of captured images, the plurality of captured images being acquired by controlling the motorized stage and the imaging apparatus;
        define a plurality of constituent images within the plurality of captured images, each of the plurality of constituent images being a portion of a respective one of the plurality of captured images and also being at least a portion of a respective one of images of a plurality of visual-field regions; and
        construct a first wide region image by piecing together the plurality of constituent images, the first wide region image being an image of a region wider than the visual-field region,
    wherein:
    the plurality of captured images are images of a plurality of different regions within the object surface, a plurality of optical-axis positions of the first objective that correspond to the plurality of visual-field regions are different from each other, each of the plurality of constituent images has a honeycomb-cell shape which is a regular hexagonal shape, the image sensor has a rectangular shape, the control apparatus constructs a second wide region image by piecing together a plurality of second captured images acquired by controlling the motorized stage and the imaging apparatus, the second wide region image being an image of a region wider than the visual-field region, and the imaging system satisfies the following conditional expressions:

$$0.5D/M \leq PD \leq D/M \tag{4}$$

$$0.5L/M \leq PL \leq L/M \tag{5}$$

where D indicates a length of a shorter edge of the image sensor, L indicates a length of a longer edge of the image sensor, M indicates a magnification of the optical system, PD indicates a distance between optical-axis positions at times of acquiring two second captured images adjacent to each other in a direction parallel to the shorter edge, and PL indicates a distance between optical-axis positions at times of acquiring two second captured images adjacent to each other in a direction parallel to the longer edge.

6. The imaging system of claim 5, wherein, based on the second wide region image, the control apparatus determines settings for constructing the first wide region image.

7. The imaging system of claim 6, wherein the settings include a plurality of imaging positions that are optical-axis positions at times of acquiring the plurality of captured images, an orientation of the honeycomb-cell shapes, and an order in which the plurality of imaging positions are reached for image shooting.

8. The imaging system of claim 7, wherein, under a condition in which a number of times image shooting is performed is minimized, the control apparatus determines the plurality of imaging positions, the orientation, and the order in which the plurality of imaging positions are reached for image shooting.

9. The imaging system of claim 5, wherein before constructing the first wide region image, the control apparatus causes a display apparatus to display a third wide region image generated by overlaying contours of the plurality of constituent images that are to constitute the first wide region image to the second wide region image.

10. The imaging system of claim 5, wherein:
the optical system further includes a second objective to be switched with the first objective for use, the second objective having a magnification lower than a magnification of the first objective, and the control apparatus:
constructs the first wide region image by using the first objective, and
constructs the second wide region image by using the second objective.

11. The imaging system of claim 10, wherein:
the optical system further includes an aperture stop, and
the imaging system satisfies the following conditional expressions:

$$0.3 < NA2/NA20 < 1 \tag{6}$$

$$NA2 < NA1 \leq NA10 \tag{7}$$

where NA10 indicates a maximum numerical aperture of the first objective, NA20 indicates a maximum numerical aperture of the second objective, NA1 indicates a numerical aperture of the first objective limited by the aperture stop when a captured image is acquired using the first objective, and NA2 indicates a numerical aperture of the second objective limited by the aperture stop when a second captured image is acquired using the second objective.

12. An imaging system comprising:
an imaging apparatus that includes an image sensor for converting an optical image into an electric signal and acquires a captured image based on the electric signal;
an optical system that includes a first objective and that forms, within the image sensor, an optical image of a visual-field region, the visual-field region being a region within an object surface that corresponds to an objective field number (OFN) of the first objective;
a motorized stage that moves the object surface with respect to an optical axis of the first objective; and
a control apparatus that performs control to:
acquire a plurality of captured images, the plurality of captured images being acquired by controlling the motorized stage and the imaging apparatus;
define a plurality of constituent images within the plurality of captured images, each of the plurality of constituent images being a portion of a respective one of the plurality of captured images and also being at least a portion of a respective one of images of a plurality of visual-field regions; and
construct a first wide region image by piecing together the plurality of constituent images, the first wide region image being an image of a region wider than the visual-field region, wherein:
the plurality of captured images are images of a plurality of different regions within the object surface,
a plurality of optical-axis positions of the first objective that correspond to the plurality of visual-field regions are different from each other,
each of the plurality of constituent images has a honeycomb-cell shape which is a regular hexagonal shape,
the image sensor has a rectangular shape, and
the imaging system satisfies the following conditional expressions:

$$2 \leq (1.22 \times \lambda / NAI)/k \leq 10 \tag{8}$$

$$0.1 \leq k/M \leq 0.25 \tag{9}$$

where $\lambda$ indicates a wavelength of light incident on the image sensor, NAI indicates a numerical aperture of an image side of the optical system, k indicates a pixel pitch of the image sensor, and M indicates a magnification of the optical system.

13. The imaging system of claim 1, wherein the optical system further includes:
a tube lens that forms a primary image of the visual-field region in cooperation with the first objective, and
a relay optical system that projects the primary image onto the image sensor, and
wherein the relay optical system comprises a zoom optical system with a variable magnification.

14. An image construction method comprising:
forming, within an image sensor having a rectangular shape, an optical image of a visual-field region that is a region within an object surface that corresponds to an objective field number (OFN) of a first objective;

acquiring a plurality of captured images, each captured image being acquired based on an electric signal into which the optical image is converted by the image sensor;

defining a plurality of constituent images within the plurality of captured images, each of the plurality of constituent images being a portion of a respective one of the plurality of captured images and also being at least a portion of a respective one of images of a plurality of visual-field regions; and constructing a first wide region image by piecing together the plurality of constituent images, the first wide region image being an image of a region wider than the visual-field region, wherein:

each of the plurality of constituent images has a honey-comb-cell shape which is a regular hexagon shape, the plurality of captured images are images of a plurality of different regions within the object surface, the plurality of captured images include six captured images acquired by performing image capturing under a condition in which an optical axis of the first objective is located at each of six second positions equally distant from a first position, where one constituent image of the plurality of constituent images is defined as a first constituent image, six constituent images, of the plurality of constituent images, that surround the first constituent image are defined as six second constituent images, and an optical-axis position at a time of acquiring a captured image that includes the first constituent image as a portion thereof is defined as the first position, a plurality of optical-axis positions of the first objective that correspond to the plurality of visual-field regions are different from each other, and the following conditional expression is satisfied:

$$0.7 \le H/D \le 1.2 \qquad (1)$$

where H indicates a length of a diagonal of regular hexagonal regions on the image sensor, each regular hexagonal region corresponding to a respective one of the plurality of constituent images, and D indicates a length of a shorter edge of the image sensor.

* * * * *